(12) United States Patent
Jackson et al.

(10) Patent No.: US 6,397,978 B1
(45) Date of Patent: Jun. 4, 2002

(54) HAND BRAKE FOR A RAIL CAR

(76) Inventors: John M. Jackson; Robert G. Jackson, both of 3121 Boyer Rd., Coloma, MI (US) 49038

( * ) Notice: Subject to any disclaimer, the term of this patent is extended or adjusted under 35 U.S.C. 154(b) by 0 days.

(21) Appl. No.: 09/663,518

(22) Filed: Sep. 15, 2000

Related U.S. Application Data

(60) Provisional application No. 60/221,784, filed on Jul. 31, 2000.

(51) Int. Cl.⁷ .............................................. B61H 13/00
(52) U.S. Cl. ..................... 188/33; 188/107; 188/1.11 R
(58) Field of Search ............................ 188/107, 106 F, 188/153 R, 265, 2 D, 1.11 W, 1.11 R, 1.11 E, 52, 33; 74/505; 303/7

(56) References Cited

U.S. PATENT DOCUMENTS

| | | | | |
|---|---|---|---|---|
| 1,491,753 A | * | 4/1924 | Sauvage | 188/107 |
| 1,524,426 A | * | 1/1925 | Farmer | 188/107 |
| 1,665,227 A | * | 4/1928 | Smith | 188/107 |
| 1,792,895 A | * | 2/1931 | Cowlishaw | 188/107 |
| 1,799,422 A | * | 4/1931 | Hoover | 188/107 |
| 1,884,531 A | * | 10/1932 | Bentley | 188/107 |
| 1,890,623 A | * | 12/1932 | Scott | 188/107 |
| 6,039,158 A | * | 3/2000 | Fox et al. | |
| 6,179,093 B1 | * | 1/2001 | Daughtery, Jr. | 188/107 |
| 6,237,722 B1 | * | 5/2001 | Hammond et al. | 188/1.11 R |

OTHER PUBLICATIONS

1997 Car & Locomotive Cyclopedia, Section 8, Freight Car Brakes, four pages.
Two Photos of prior art hand brake.

\* cited by examiner

*Primary Examiner*—Douglas C. Butler
(74) *Attorney, Agent, or Firm*—James D. Hall; Ken C. Decker

(57) ABSTRACT

A hand brake for a rail car which is adapted to be connected to the actuator which forms a part of the brake system of the car. A chain wheel about which the actuator chain is wrapped is rotated through a hydraulic cylinder causing the chain to actuate the brake system.

20 Claims, 25 Drawing Sheets

Fig. 1

HAND BRAKE FOR A RAIL CAR

CROSS-REFERENCE TO RELATED APPLICATION

This is a continuation of Provisional Application Serial No. 60/221784 filed Jul. 31, 2000.

BACKGROUND OF THE INVENTION

For the past many years the freight industry has used a hand brake to restrain the movement of a rail car when the car is parked and not connected to a locomotive. Such brakes are applied and released manually by brakeman or other rail car service personnel. Since rail cars commonly weigh as much as 150 tons, such hand brakes must apply through the braking system a large force between the brake shoes and the wheels of the car. Typical hand brake systems are shown in the 1997 issue of *Car and Locomotive Cyclopedia*, in Section 8 entitled "Freight Car Brakes" which is incorporated herein by reference.

Heretofore, typical hand brakes included a hand wheel which is grasped by the rail car service personnel and rotated to cause the chain connected to the braking system of the car to be wound about a chain wheel in actuating the braking system. The force needed to be applied to the hand wheel in order to properly set the brake system is normally between 100 and 200 pounds. This would be an excessive required turning force should the rail industry desire that the braking operation be gender neutral. Also, the rail car service personnel or brakeman must climb onto the rail car to operate the hand brake, which is less safe than if the brake could be operated from a ground position. Further, the applied necessary brake force varies greatly so that one is never certain whether a sufficient amount of force has been applied to the braking system to actually hold the car or whether too great of a force may have been applied which could cause damage to the connected air brake system. Also there is no indicator which informs the rail car service personnel that the brake has been applied or is not applied thus making it difficult to determine whether the hand brake has been properly applied on parked cars or released when the cars are readied for movement.

SUMMARY OF THE INVENTION

In the subject invention, the hand wheel is replaced by a hydraulic cylinder which is connected by gearing to the chain wheel. The hydraulic cylinder which in the preferred embodiment is actuated by a handle causes rotation of the chain wheel which in turn causes the wrapped actuator chain to be drawn in order to actuate the braking system. A securement device which is releasable and which is preferably of a pawl and ratchet construction is provided to secure the chain wheel against rotative movement even if hydraulic pressure is reduced when the desired braking force has been applied by the actuator chain to the braking system. An indicator is also provided which serves as a visual indication of whether the hand brake is set or released.

Accordingly, it is an object of this invention to provide a hand brake which is for a rail car and which is of simplified and reliable operation.

Another object of this invention is to provide a hand brake which is for a rail car and which may be actuated with minimal manual force.

Another object of this invention is to provide a braking system which is for a rail car and which includes a hand brake having an indicator to indicate whether the brake has been appropriately applied or is in a released or unapplied position.

Still another object of this invention is to provide a hand brake which is for a rail car and which utilizes hydraulic actuation through a hydraulic cylinder having a preset high pressure limit so as to adapt the hand brake for multiple classes of hand brake operation.

And still another object is to protect the brake system from excessive applied hand brake force.

A further object is to control the hand brake release force rate.

A still further object is to connect the inactive side of the hydraulic cylinder to the reservoir or tank to provide erosion and seal protection for the cylinder.

Other objects of this invention will become apparent upon a reading of the following description.

BRIEF DESCRIPTION OF THE DRAWINGS

Alternate constructions of the subject invention have been chosen wherein.

DESCRIPTION OF THE PREFERRED EMBODIMENT

Figure 1:
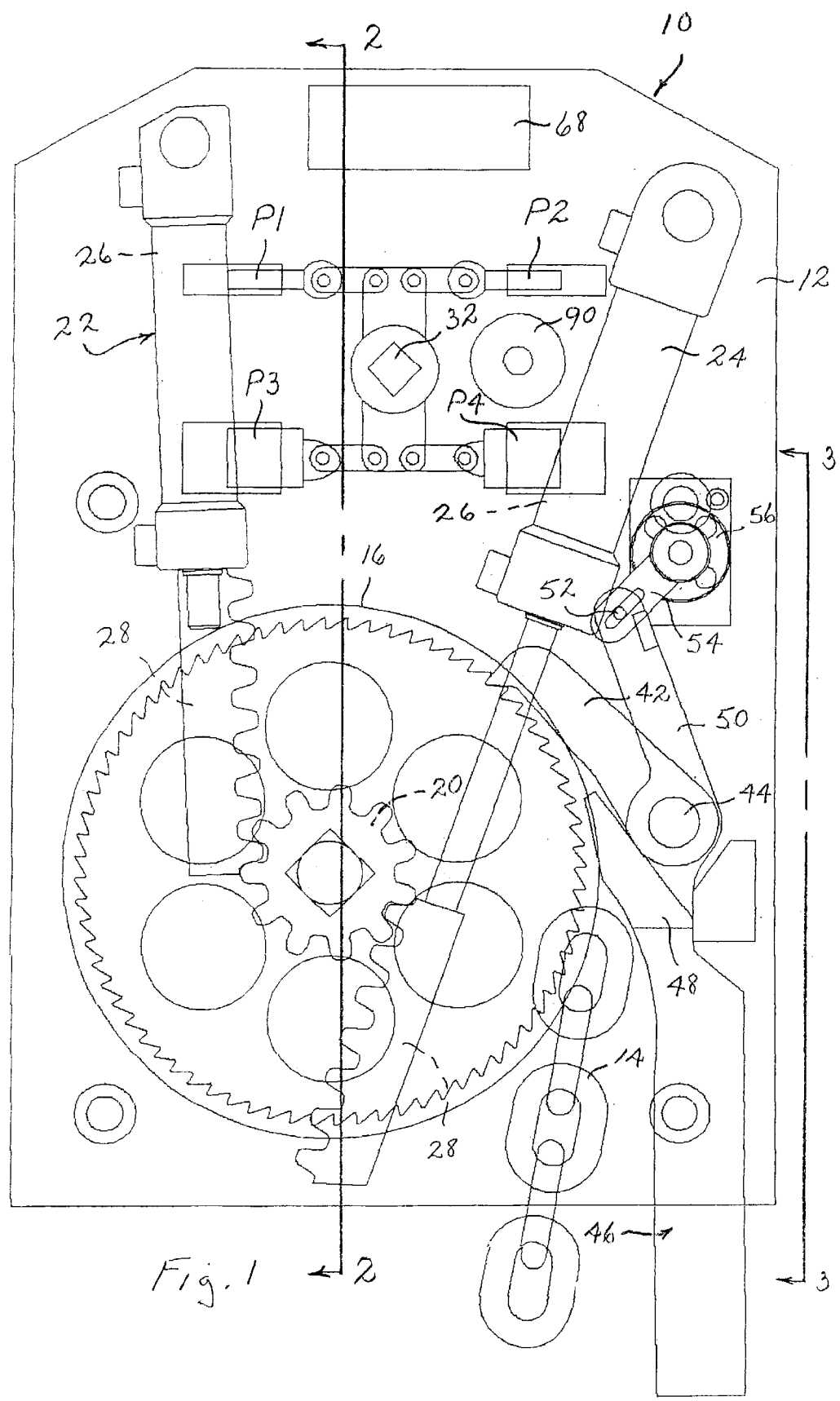
FIG. 1 is a front view of one embodiment of this invention showing a portion of the housing of the brake device removed for illustrative purposes.
Figure 2:
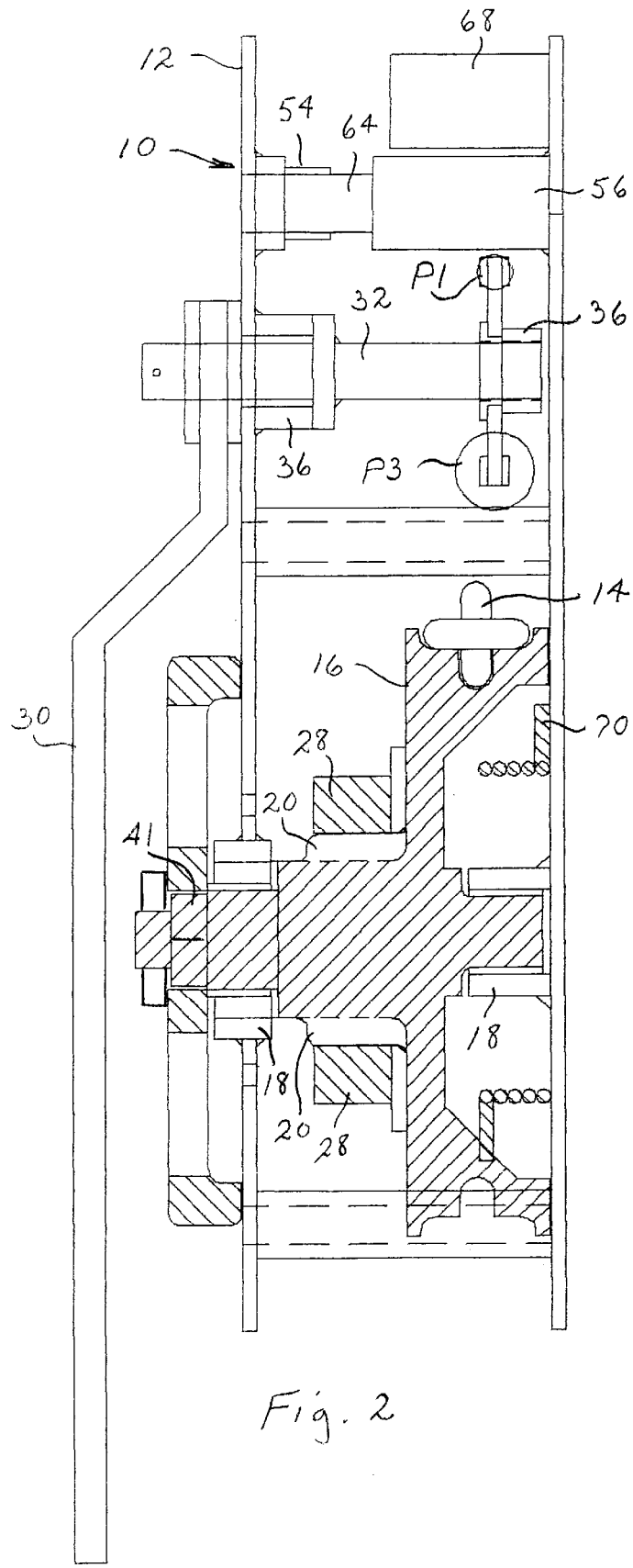
FIG. 2 is a sectional view as seen generally along line 2—2 of FIG. 1 with the outer most face of the housing in place.
Figure 3:
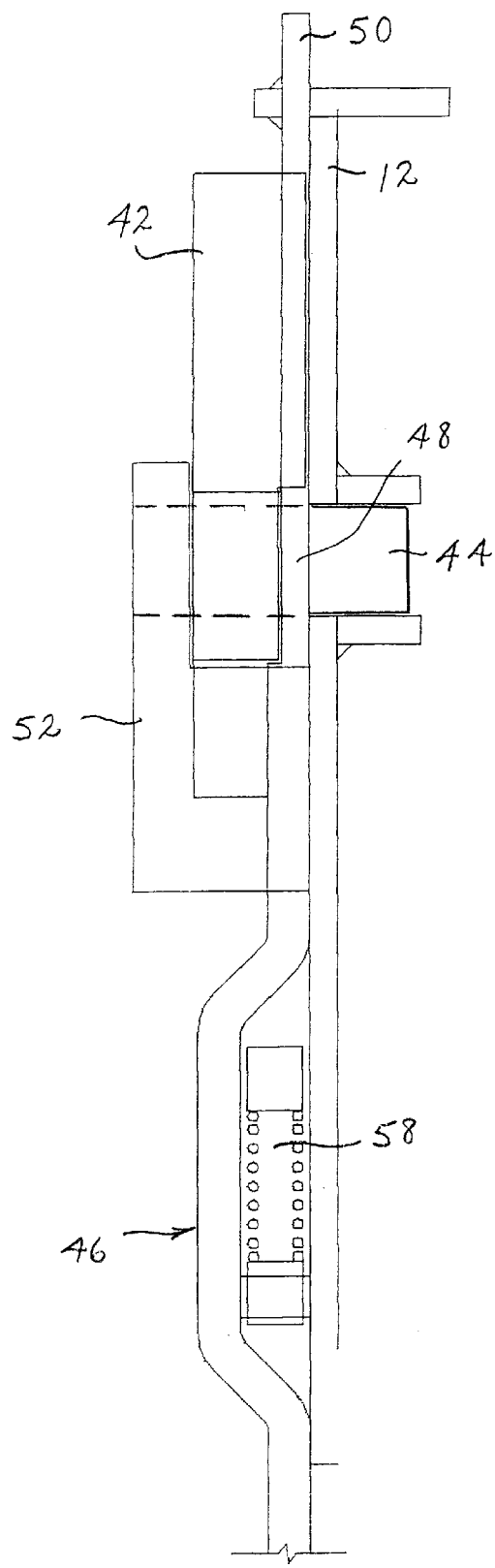
FIG. 3 is a fragmentary view of the release mechanism for the hand brake as seen generally from line 3—3 in FIG. 1.
Figure 4:
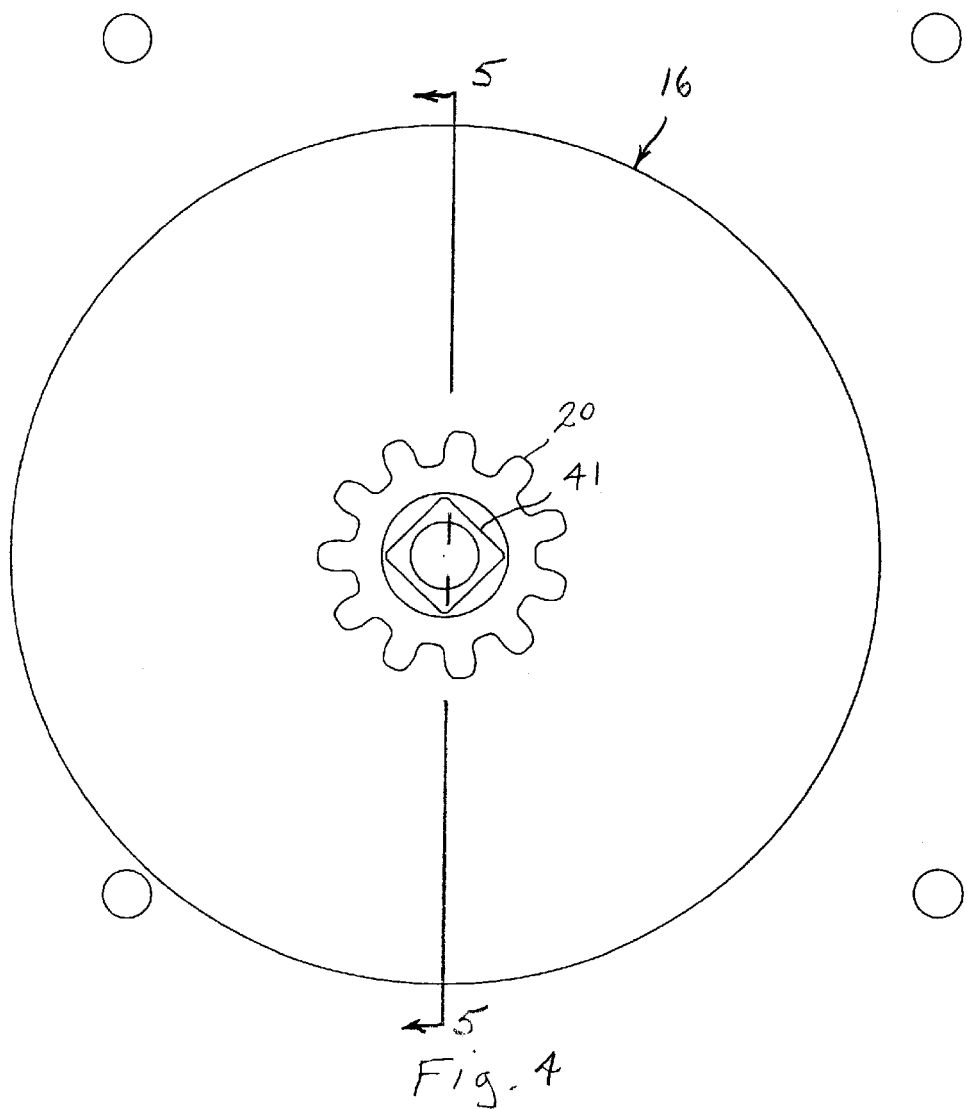
FIG. 4 is a face view of the chain wheel.
Figure 5:
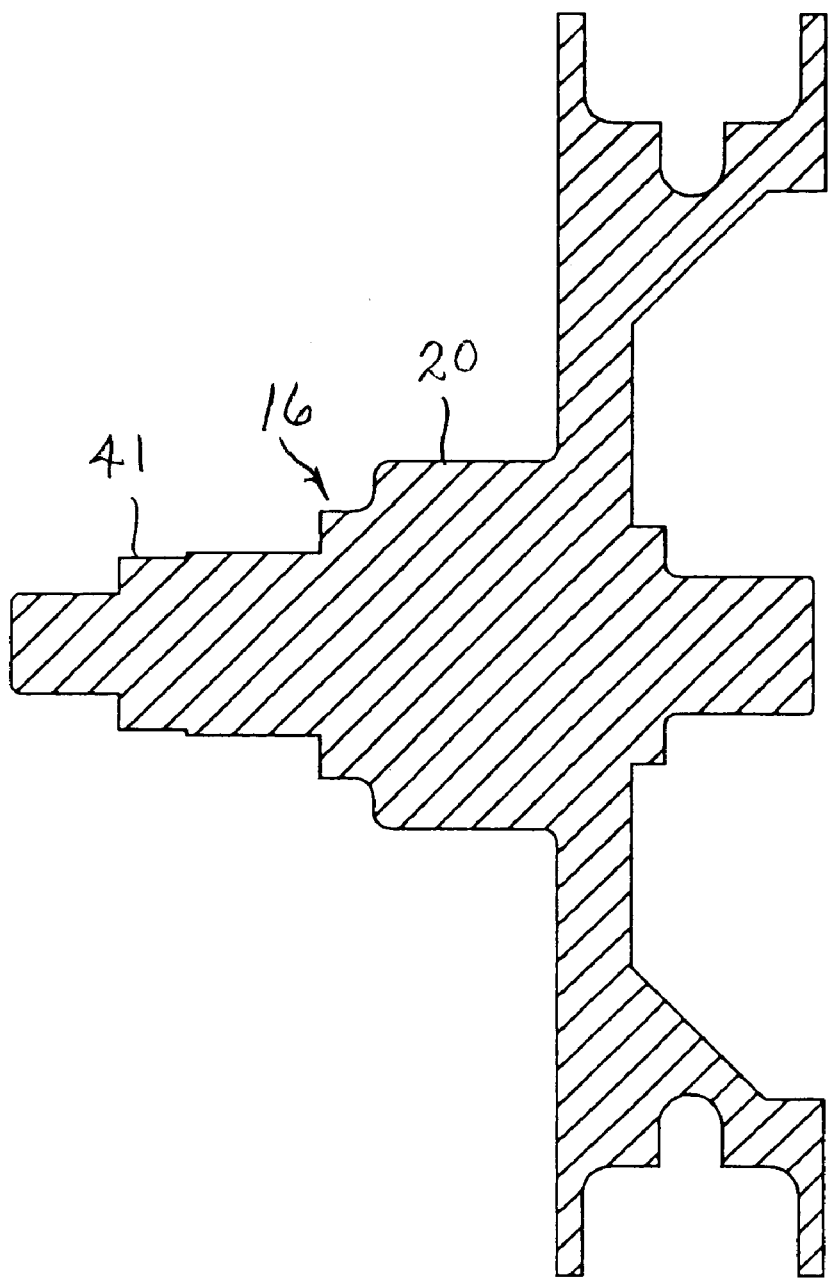
FIG. 5 is a sectional view of the chain wheel seen along line 5—5 of FIG. 4.
Figure 6:
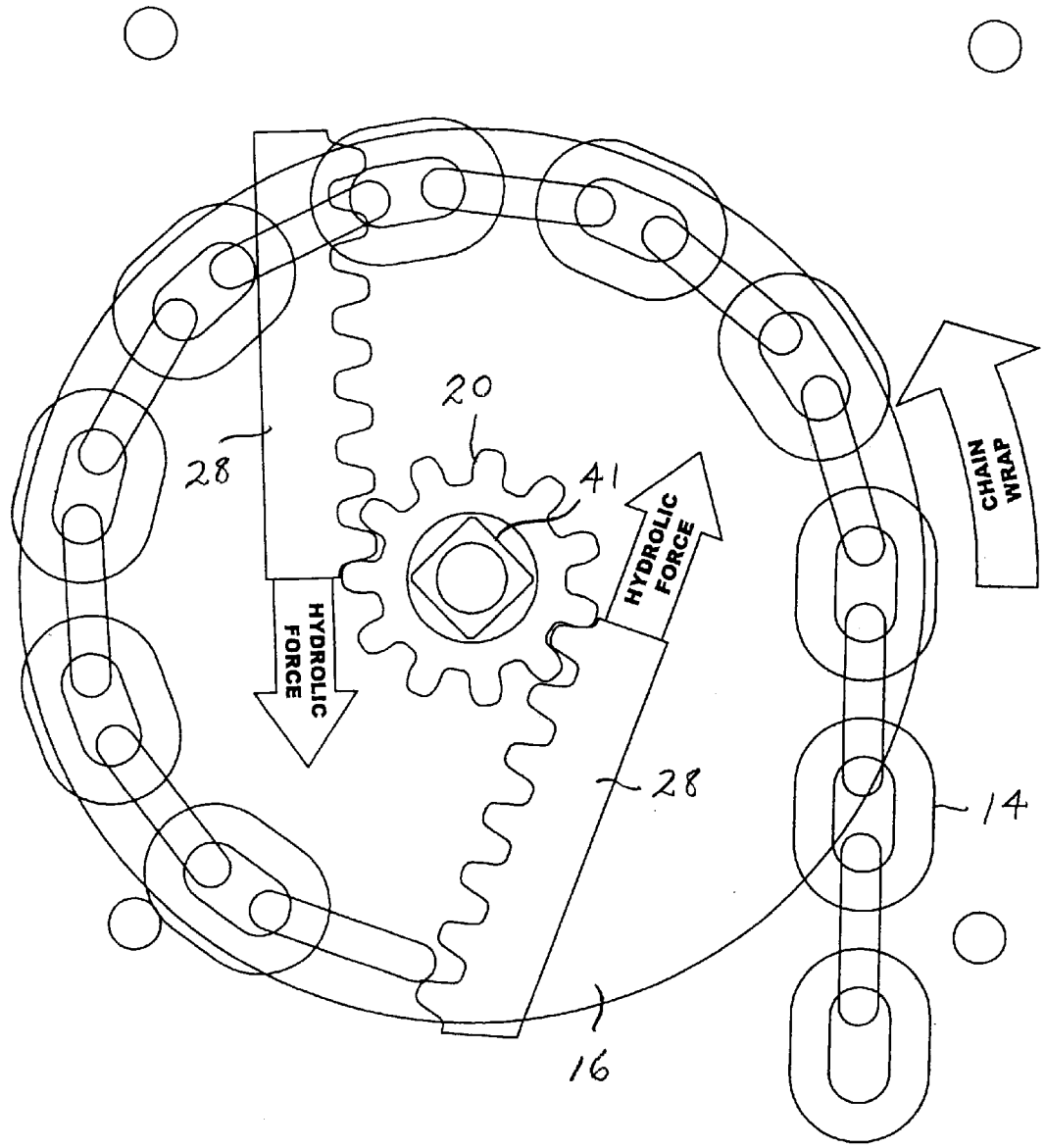
FIG. 6 is a face view of the chain wheel showing the chain wrapped about the wheel and the hydraulically actuated racks engaging the pinion gear of the wheel.
Figure 7:
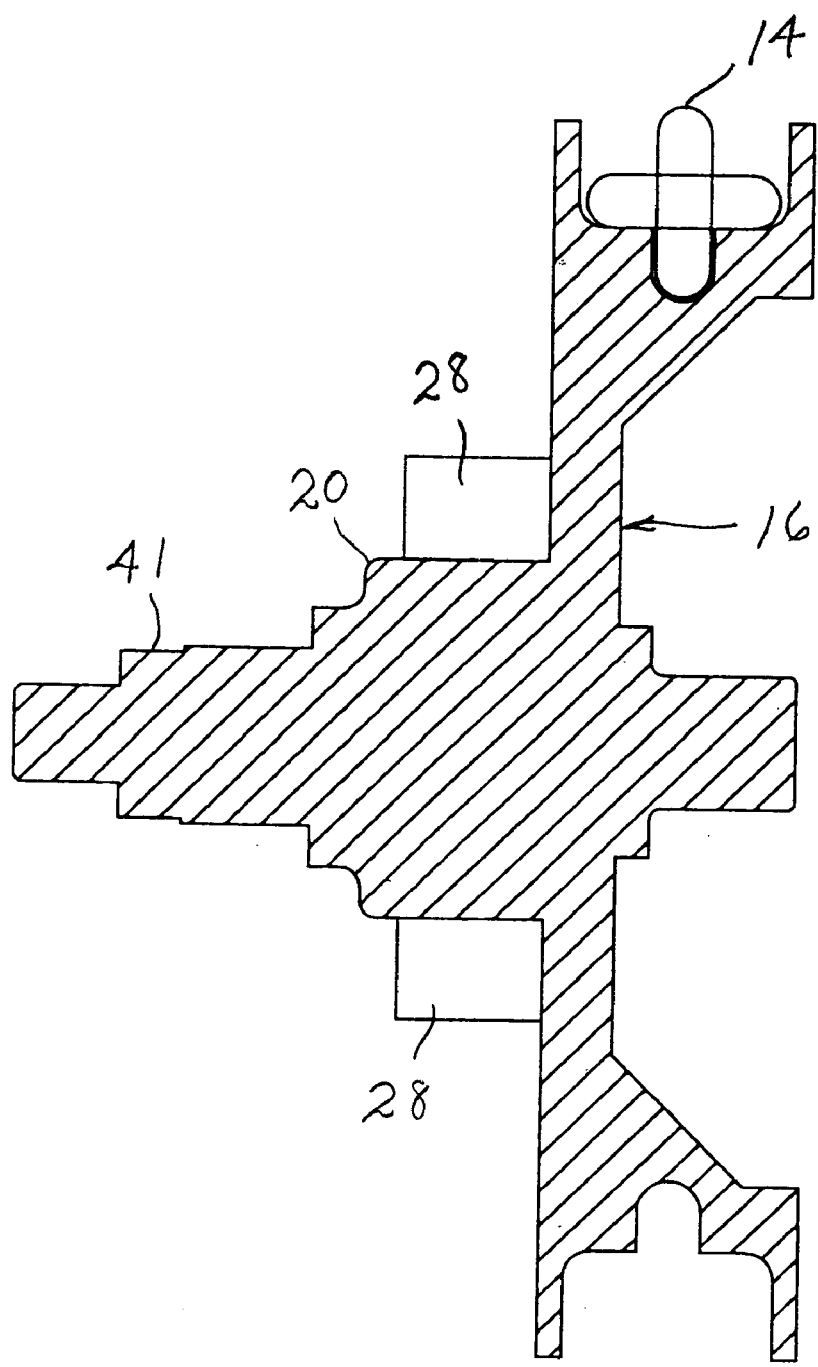
FIG. 7 is a sectional view of the illustrated drawing in FIG. 6.

The embodiments described are not intended to be exhaustive but are presented to enable one having an ordinary skill in the art to use the invention.

The brake 10 of this invention includes a housing 12 which is adapted to be mounted to the end or side of a rail car in close proximity to the actuator chain 14 forming a part of the braking system for the car. Chain 14 extends around a chain wheel 16 which is journaled for rotative movement within bearings 18 in housing 12. Chain wheel 18 includes a coaxial, integral pinion gear 20.

Mounted within housing 12 are a pair of cylinders 22, 24, preferably hydraulically actuated. Mounted within each cylinder 22, 24 is a piston and rod 26. Each of the cylinder rods carries a gear rack 28. Gear racks 28 are positioned on opposite sides of pinion gear 20 of chain wheel 16 in driving engagement with the pinion so that as one gear rack is extended to drive the chain wheel the other gear rack is retracted to also drive the wheel. Thus, as gear racks 28 are extended and retracted in driving engagement with pinion gear 20, chain wheel 16 will rotate in a counter-clockwise direction as viewed in the figures.

Figure 15:
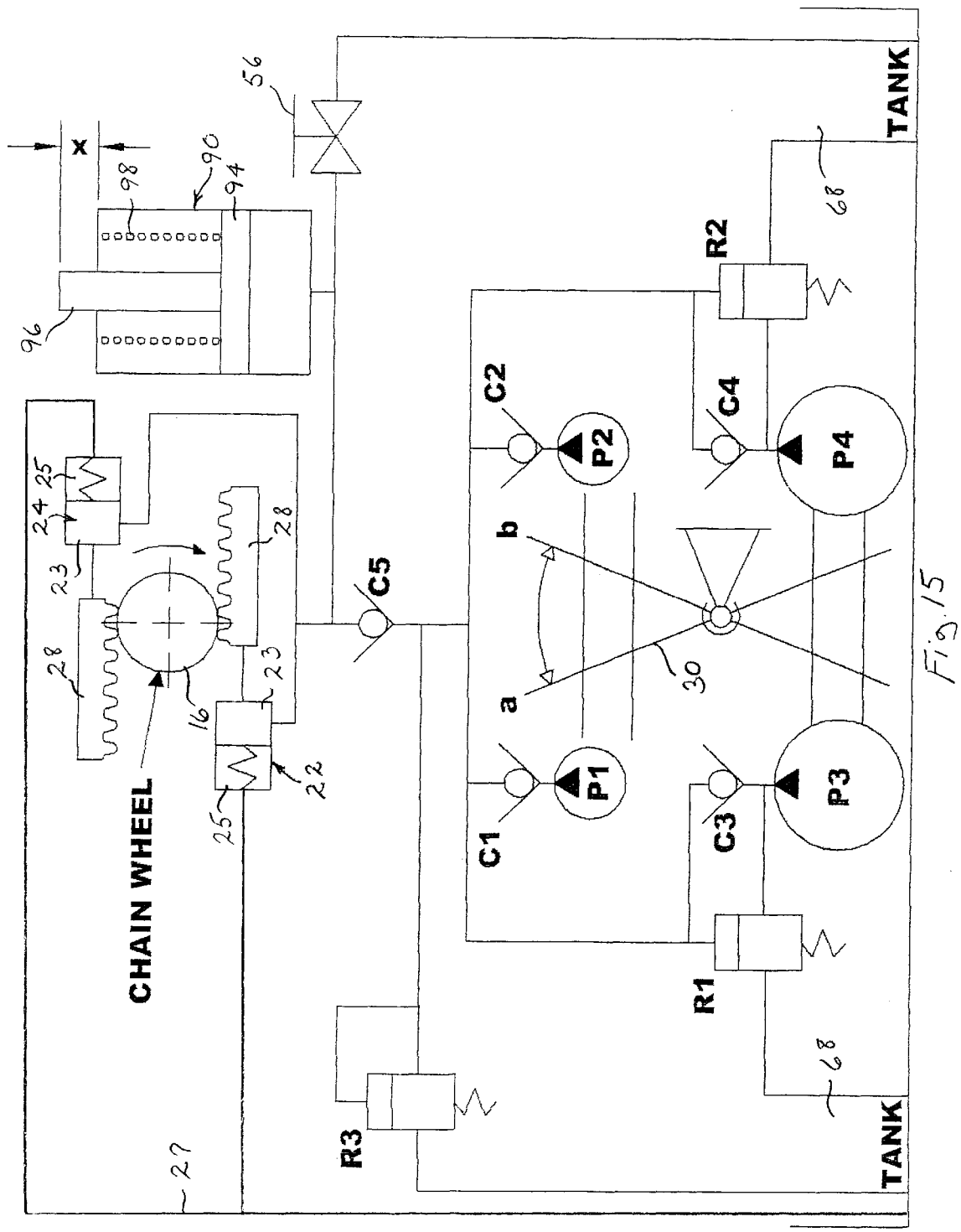
FIG. 15 is a schematic view illustrative of the hydraulic system for the hand brake of this invention.
Figure 25:
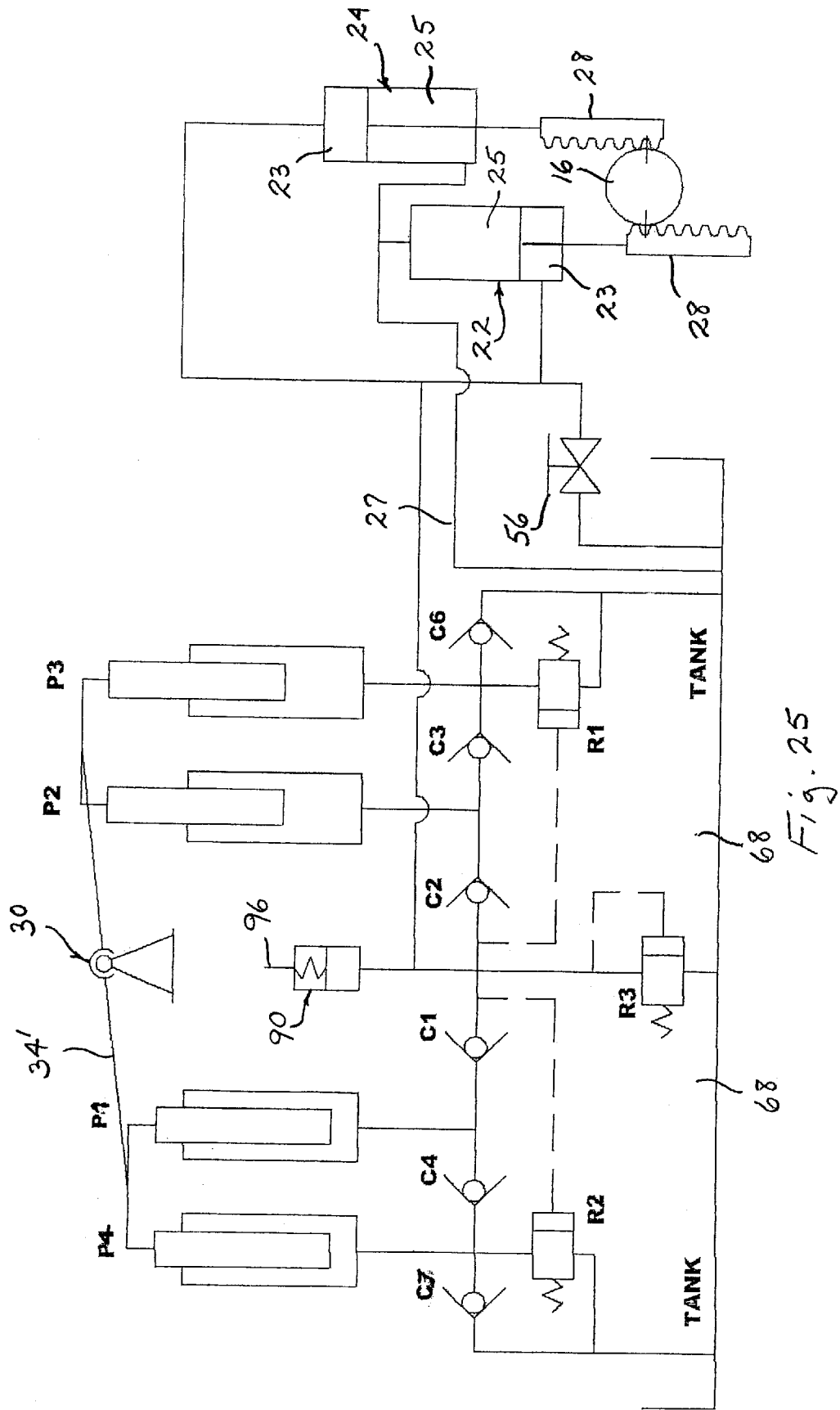
FIG. 25 is a schematic view of an hydraulic system utilizing the pump components of FIG. 20.

Associated with cylinders 22, 24 are four pumps, designated P 1, P 2, P 3, and P 4. Pumps P 1–P 4 are connected to cylinders 22, 24 by hydraulic lines as shown in FIGS. 15 and 25. Pumps P 1–P 4 are interconnected to a pump handle 30 and a connected drive shaft 32 through a set of linkages 34. Shaft 32 is journaled within suitable bearings 36 in housing 12 and through linkage 34 causes reciprocating actuation of the pumps upon pumping or reciprocating movement of pump handle 30. As pump handle 30 and connected shaft 32 are moved counter-clockwise as viewed in FIG. 1, pumps P 1 and P 4 pump the hydraulic fuel or oil into cylinders 22, 24 causing the extension and retraction of the gear racks 28 as the case may be, while pumps P 2 and P 3 are filled with oil. As the pump handle and shaft 32 are reciprocated, that is moved in a clockwise direction as viewed in FIG. 1, pumps P2 and P 3 pump oil into cylinders 22, 24 to continue the extension and retraction of the gear racks 28 while pumps P 1 and P 4 are filled with oil or hydraulic fluid. Each of the pumps P 1–P 4 include an internal cylinder or similar pumping mechanism by which the hydraulic fluid is forcibly ejected from the pump upon reciprocating movement of the pump handle.

Figure 8:
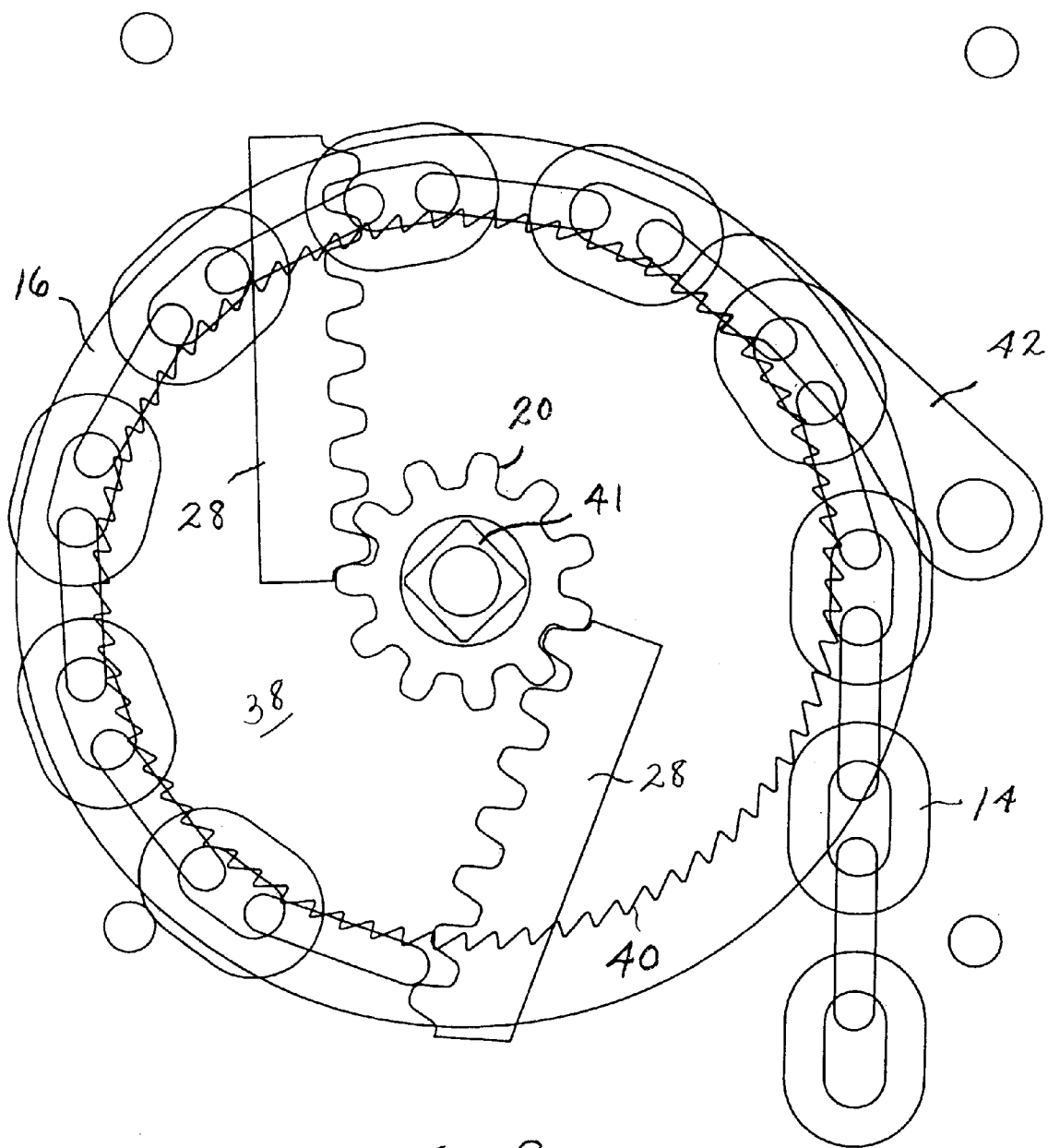
FIG. 8 is a face view of the chain wheel and actuator racks with the ratchet wheel connected to the chain wheel and the engaging pawl.
Figure 9:
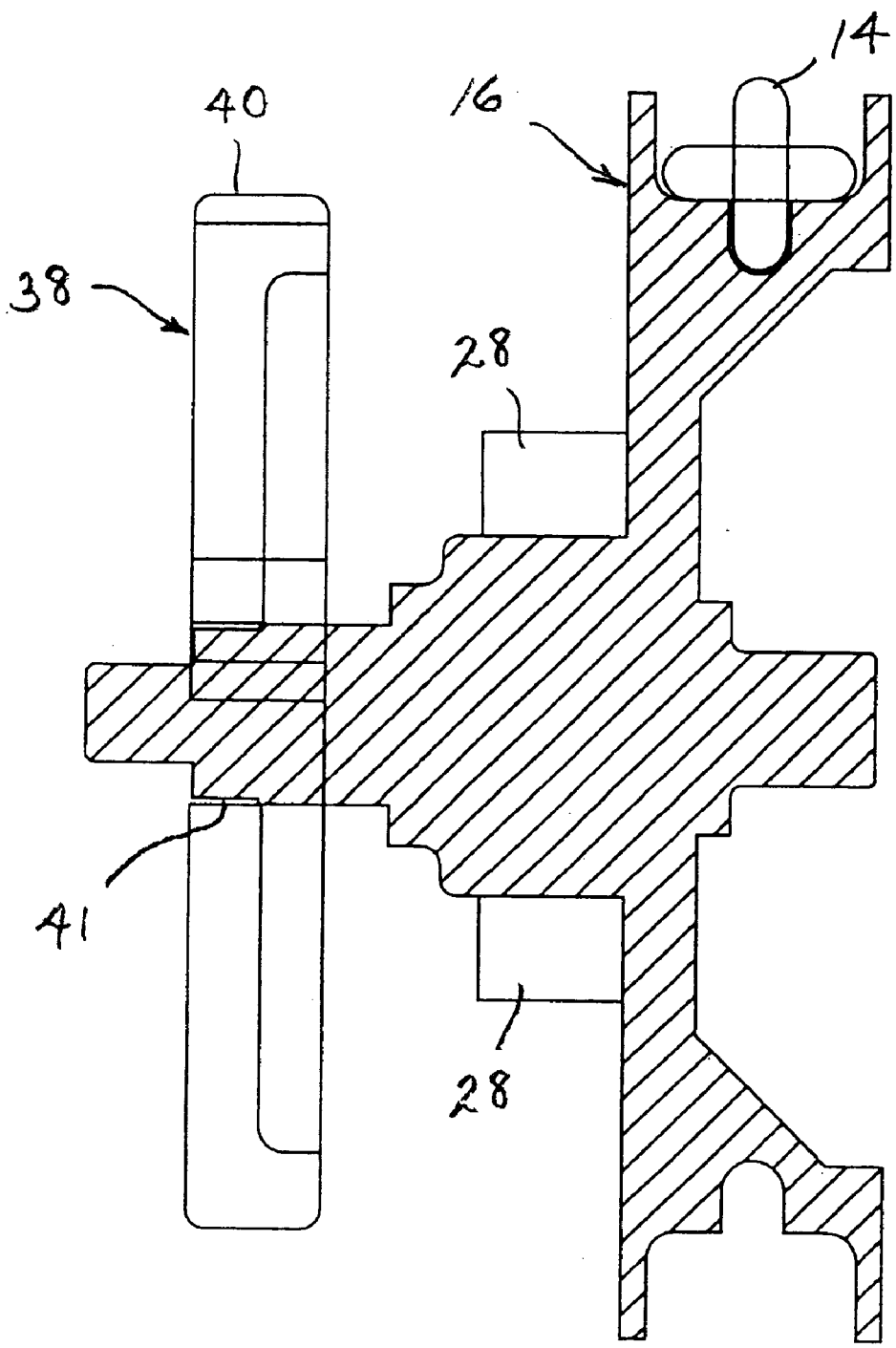
FIG. 9 is a sectional view of the chain wheel and ratchet wheel illustrated in FIG. 8.
Figure 10:
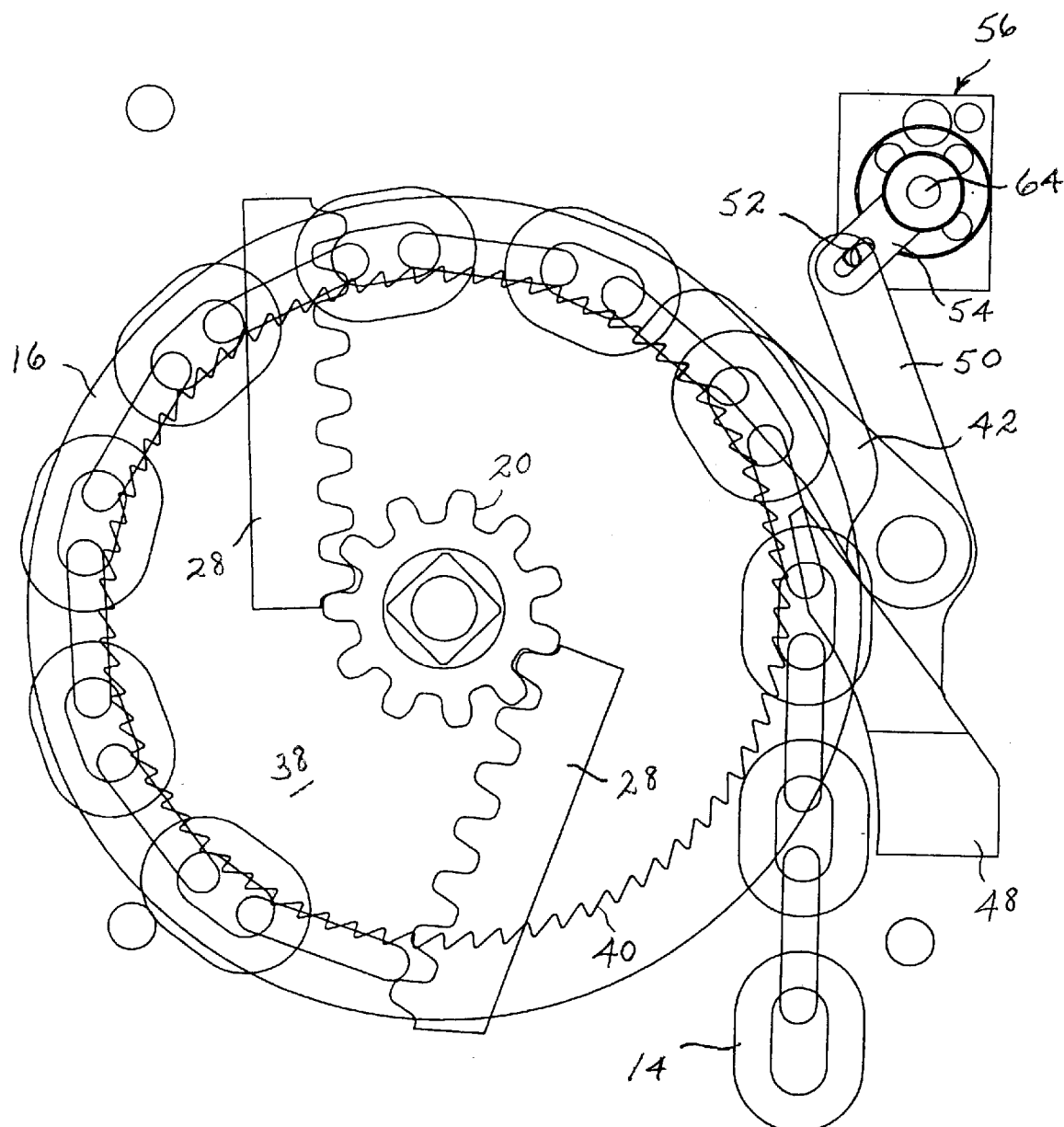
FIG. 10 is a view of the chain wheel and ratchet wheel similar to FIG. 8 and including the release lever for the pawl and relief valve actuator, showing the pawl engaged with the ratchet wheel and the relief valve in its closed position.
Figure 11:
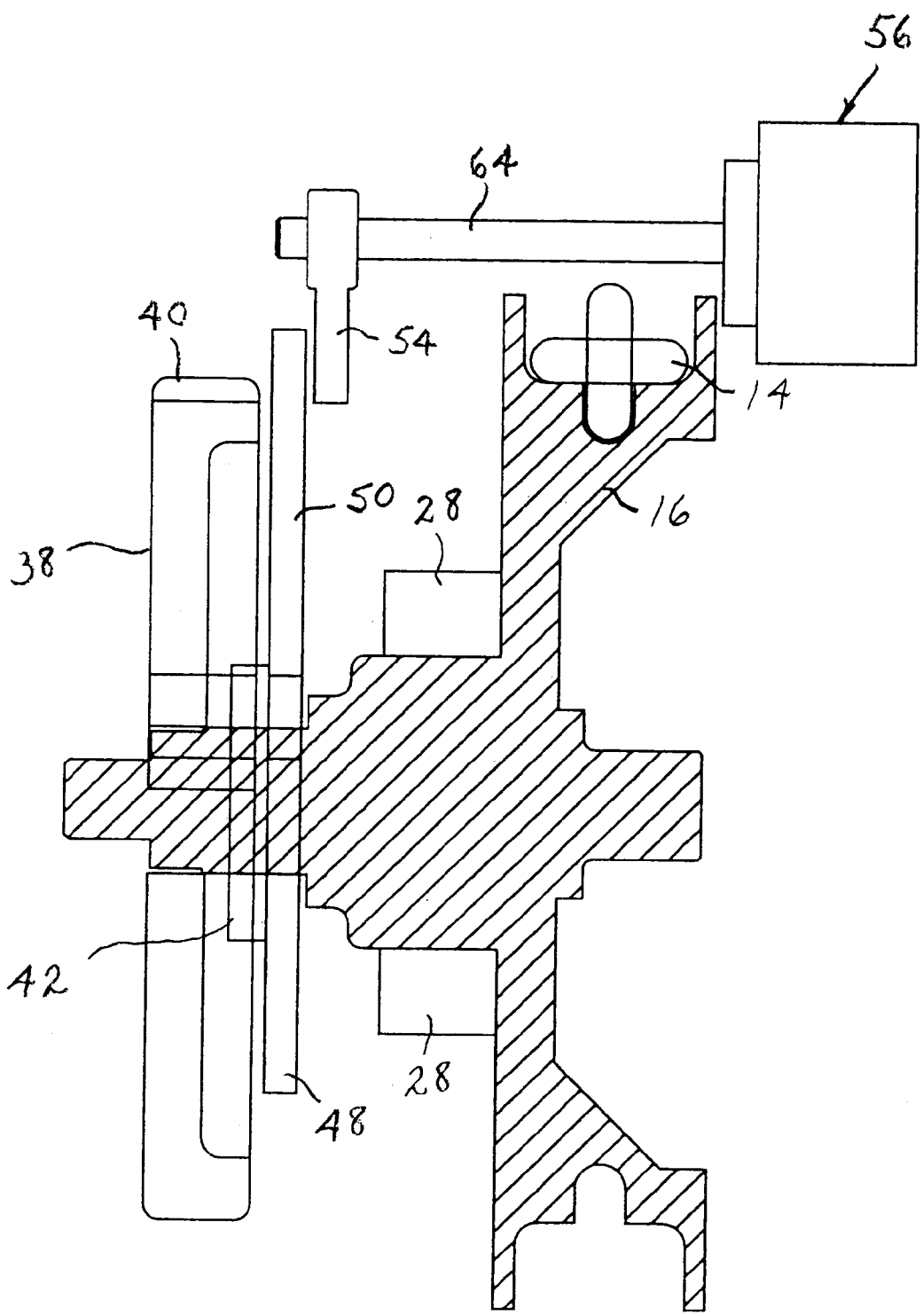
FIG. 11 is a sectional view of the chain wheel and ratchet wheel of FIG. 10 including the release lever and relief valve.
Figure 12:
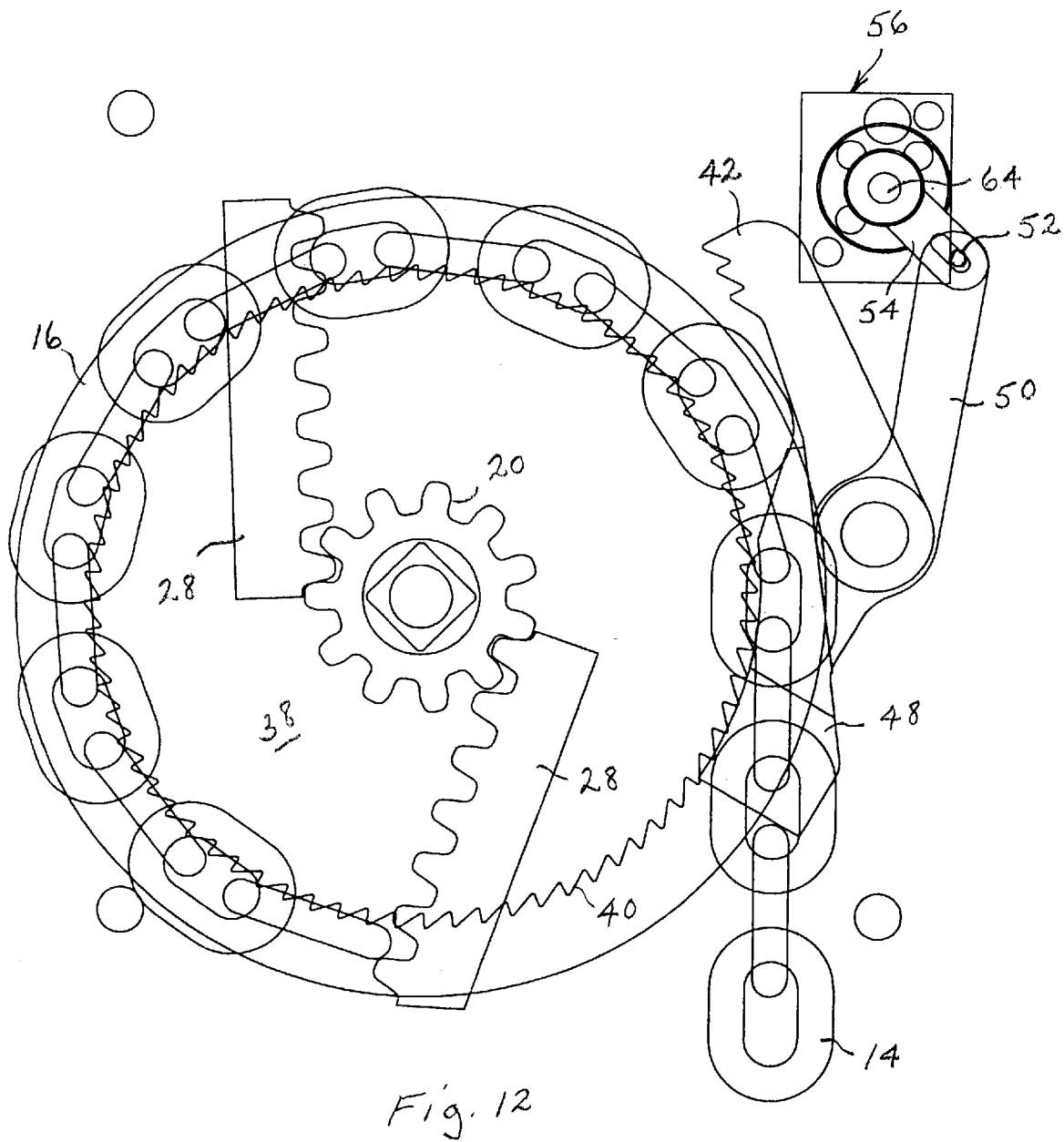
FIG. 12 is a view similar to FIG. 10 but showing the pawl released from the ratchet wheel and the relief valve in its open position.
Figure 13:
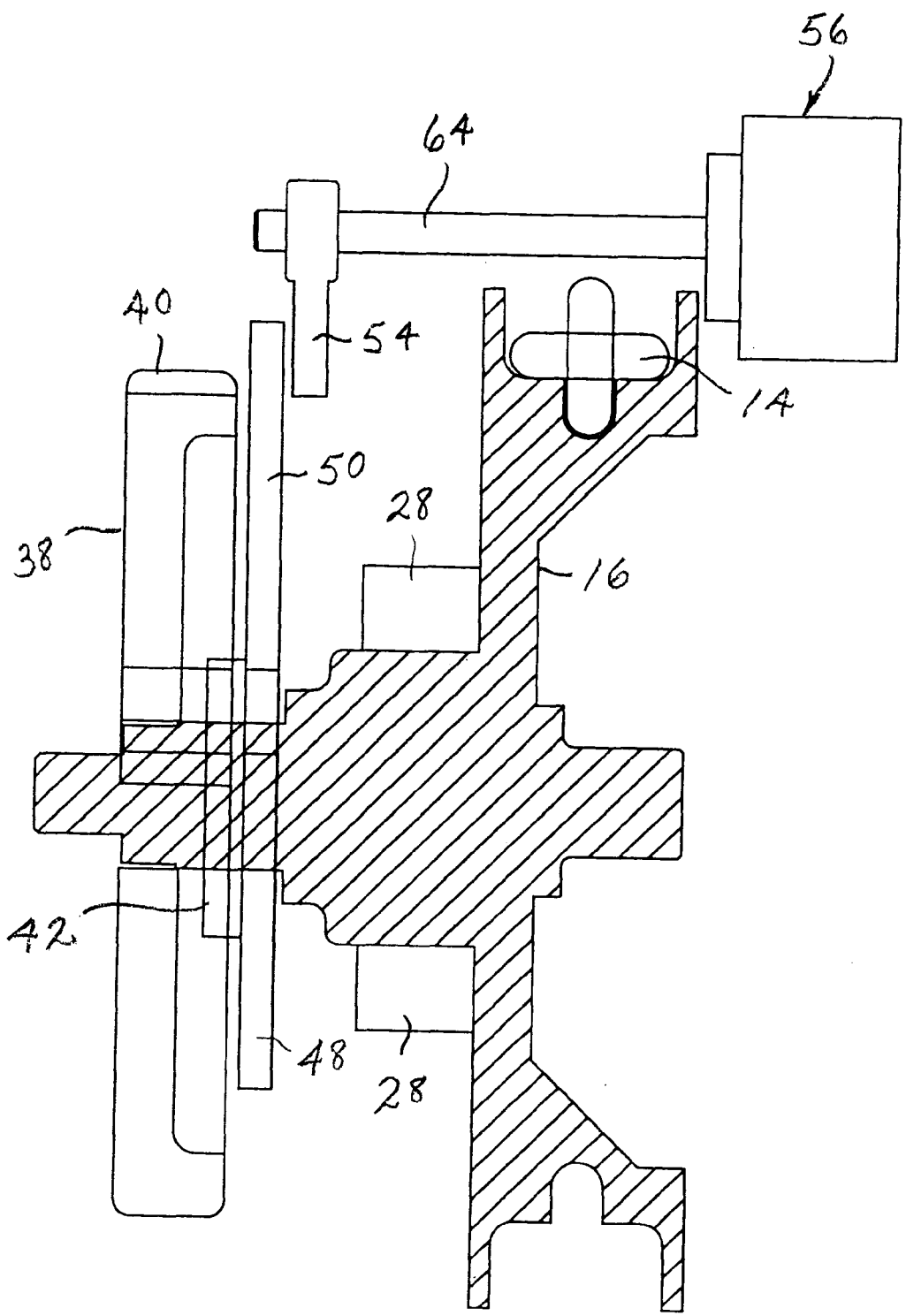
FIG. 13 is a sectional view of the chain wheel and ratchet wheel of FIG. 12 showing the relief valve in its open position.

Coaxially mounted upon chain wheel 16 is a ratchet wheel 38. A plurality of teeth 40 extend around the periphery of ratchet wheel 38. Ratchet wheel 38 is mounted upon a square shaft 41 formed along the axis of chain wheel 16 so that the ratchet wheel is secured for rotative movement with the chain wheel. A pawl 42 is journaled upon a pin 44 mounted to housing 12 and is rotatable from an engagement or locked position as seen in FIGS. 1, 8, and 10 and a disengaged or unlocked position as seen in FIG. 12. As chain wheel 16 is driven counterclockwise as viewed in the figures, pawl 42 slides over teeth 40 of the ratchet wheel. When the rotative movement of the chain wheel stops, the pawl locks with teeth 40 of the ratchet wheel which secures the chain wheel against clockwise movement which would play out chain 14. A release handle 46 is also pivotally connected about pin 44 and includes a trip part 48 and an extension part 50 which projects from the opposite side of pin 44. A reinforcement bracket 52 which is connected to housing 12 extends over pawl 42 and release handle 46 to receive and support pin 44. Release handle 46 is constructed so that in approximately 5 degrees of rotation, trip part 48 engages pawl 42 to force the pawl outwardly relative to ratchet wheel 38. This frees the pawl from the ratchet wheel to permit rotative movement of chain wheel 16 in a clockwise direction. Extension part 50 of the release handle is connected by a pin 52 to an arm 54 of a relief valve 56. As release handle 46 is continued to be rotated in a clockwise direction as viewed in the figures about pin 44, extension part 50 of the handle causes rotation of arm 54 of the relief valve to open the relief valve. The release handle and its linkage to arm 54 is such that for a 30 degree total throw or rotative opening movement of the release handle, arm 54 of the relief valve rotates 90 degrees, thus fully opening the relief valve which includes a selected sized outlet 63 to control the rate of venting or discharge of the hydraulic fluid. FIG. 12 shows pawl 42 fully separated from ratchet wheel 38 and relief valve 56 in its full open position. Movement of release handle 46 in a counterclockwise direction as viewed in the figures, releases pawl 42 for gravitational downward movement into engagement with ratchet wheel teeth 40. A spring 58 is connected between handle 46 and housing 12 at a spaced location from pivot pin 44 to cause the handle to have over-centered positions as seen in FIG. 10 in which the pawl engages ratchet wheel 38 and relief valve 56 is closed and FIG. 12 in which the pawl is held in an extended position spaced from the ratchet wheel and relief valve 56 is in its full open position. As such, release handle 46 will have two operative positions (open and closed) dictated by the two over-centering positions of spring 58.

Figure 18:
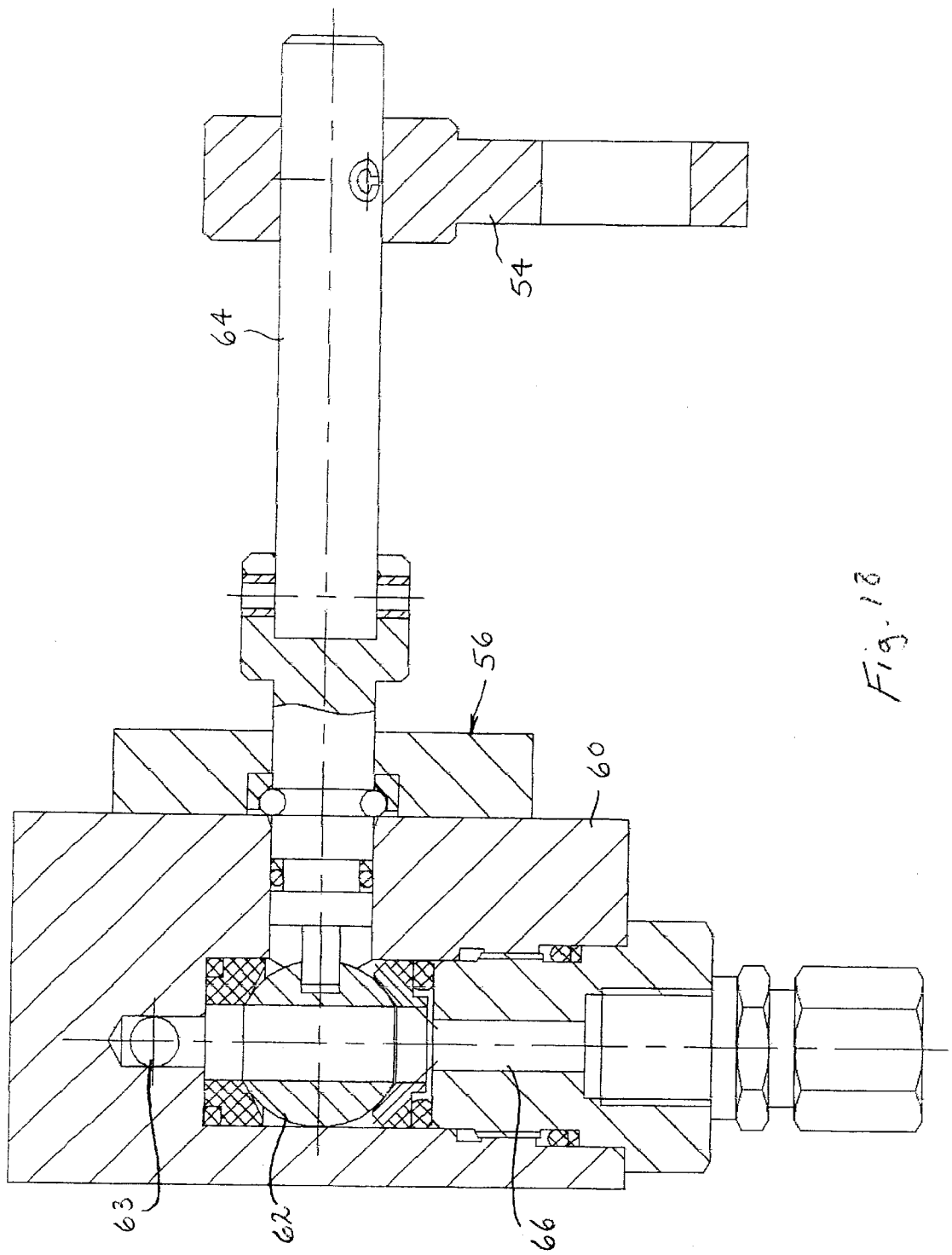
FIG. 18 is a sectional view of the relief valve in its open position.
Figure 19:
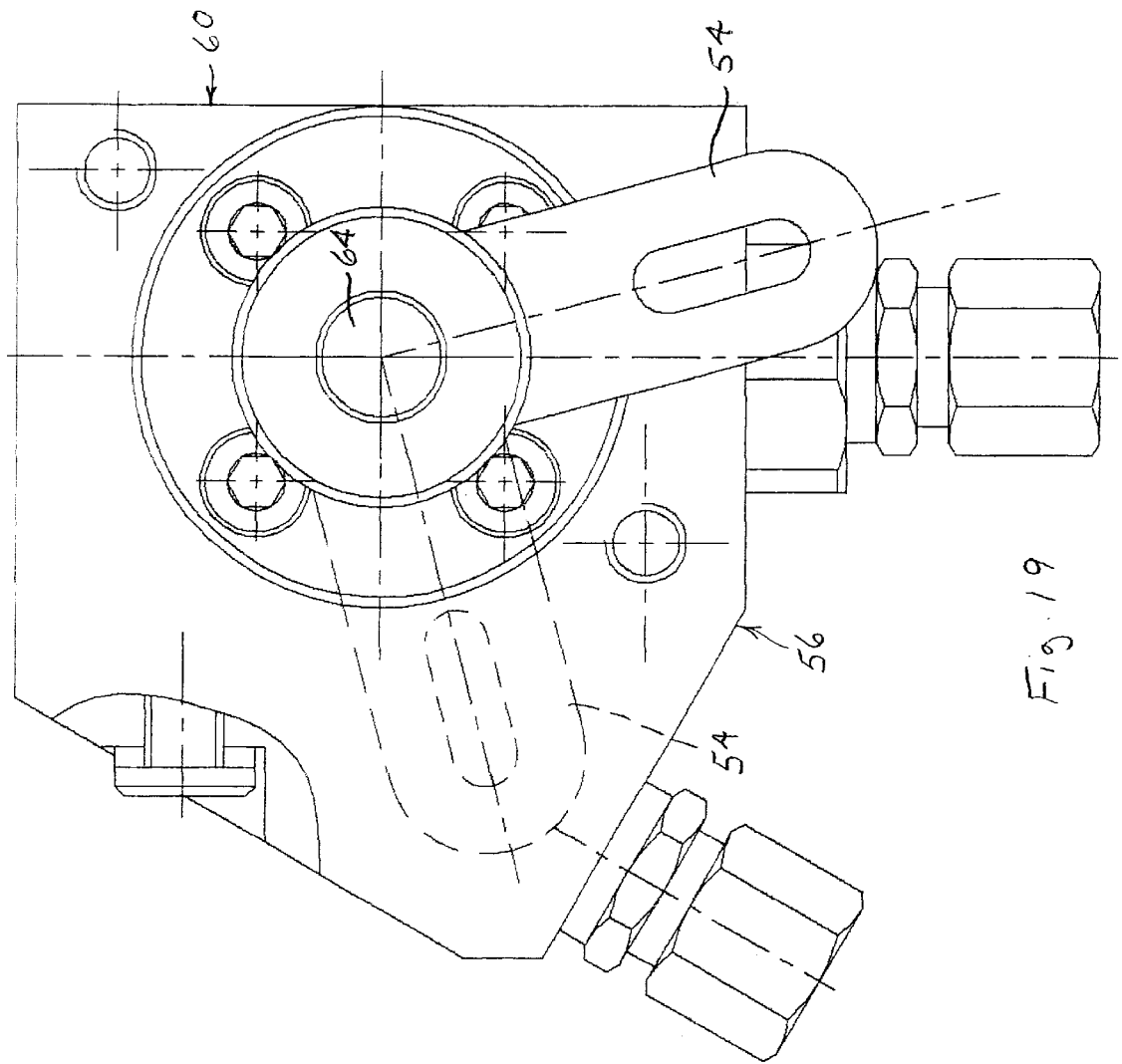
FIG. 19 is an end view of the relief valve of FIG. 18 and showing the handle thereof in broken lines in its closed position.

Relief valve 56 includes a housing 60 in which a ball valve part 62 is seated. Ball valve 62 is connected by a stem 64 to arm 54. Upon rotation of arm 54 and connected stem 64, the ball valve part of the relief valve rotates between the open position shown in FIG. 18 and a closed position preventing hydraulic fluid flow through passage 66 in the valve.

Referring to FIG. 15, which is a schematic of one hydraulic system for the hand brake of this invention, pump handle 30 is shown as being movable in reciprocating fashion between positions "a" and "b". As the handle is moved to position "a" pumps P 1 and P 4 are activated to pump the hydraulic fluid into cylinders 22 and 24 through check valves C 1, C4, and C 5. At the same time, pumps P 2 and P 3 are filled with hydraulic fluid from supply tanks 68 due to the suction created in the pumps caused by ganged linkages 34 interconnecting the pumps. During activation of pumps P 1 and P 4, chain wheel 16 is rotated through the movement of gear racks 28. This advancement of the chain wheel causes the winding of chain 14 upon the wheel to actuate the braking system of the associated rail car. As pump handle 30 is moved from position "a" to position "b" as shown in FIG. 15, pumps P 2 and P 3 pump hydraulic fluid into cylinders 22 and 24 through check valves C 2, C 3, and C 5. At this same time, pumps P 1 and P 4 are filled with fluid from tanks 68 due to the suction created within the pumps caused by their coordinated ganged movement through linkages 34. Again chain wheel 16 is further rotated by additional movement of gear racks 28 causing additional chain to be wrapped upon the wheel and further tightening of the chain and an associated setting of the brake system of the rail car. The pump handle is then manually returned from position "b" to position "a" which starts the afore-described pumping sequence over. As the pump handle is reciprocated between positions "a" and "b", pumps 1 and 4 and pumps 2 and 3 alternatively pump hydraulic fluid into cylinders 22 and 24 causing the incremental advancement of chain 14 about chain wheel 16, to cause further tensioning upon the chain and further setting of the brake system.

As the tension upon chain 14 increases during the application of the increased braking force applied to the brakes of the rail car, the pressure in cylinders 22, 24 rises and the force required to reciprocate the pump handle between positions "a" and "b" increases. At a preset pressure, such as 1,000 psi, overflow or relief valve R 2 opens to unload pump P 4 with its hydraulic fluid dumping to a tank 68. Continued reciprocating movement of the pump handle actuates pumps P 1, P 2 and P 3 until the pressure in cylinders 22, 24 rises to a second preset limit such as 2,000 psi. At this time overflow valve R 1 opens and pump P 3 is unloaded with its hydraulic fluid returning to a tank 68. By sizing, pumps 3 and 4 are relatively large volume low pressure pumps while pumps P 1 and P 2 are smaller volume high pressure pumps. Alternately, both valves R 1 and R 2 could open simultaneously at a selected pressure to unload both pumps P 3 and P 4. Continued actuation of the pump handle between positions "a" and "b" actuate in alternating fashion pumps P 1 and P 2 which due to their size reduces the pump handle force. Check valves C 3 and C 4 maintain the higher pressure produced by pumps P 1 and P 2 while large pumps P 3 and P 4 pump or dump to tanks 68 due to the open relief valves R 1 and R 2. Continued actuation of pumps P 1 and P 2 causes further movement of racks 28 and rotation of chain wheel 16, drawing chain 14 even tighter about the wheel and increasing the brake actuation force until the maximum desired actuation force is reached, such as 7,000 psi. At this preset actuation pressure overflow or pressure relief valve R 3 opens. Further advancement of gear racks 28 is halted and the chain wheel 16 stops its incremental rotation, being held by pawl 42. The brakeman actuating the pump handle will no longer hear the click of pawl 42 as it passes over and engages ratchet wheel 38. This audible indication informs the brakeman that a proper braking pressure has been reached. Additionally, once all relief values R 1, R 2 and R 3 have been opened, the pressure or force required to reciprocate the brake handle remains constant, creating a further indication to the brakeman that any further pumping serves no useful purpose. At this time pawl 42 with its engagement with the teeth of ratchet wheel 38 secures the chain wheel 16 against counter-rotation or unwinding movement and the brake system is locked.

When it is desired to release the rail car braking system, release handle 46 is moved from its closed over-center position to its open position, which represents an approximate 30 degree movement. As release handle 46 is rotated into its open position, its trip part 48 engages pawl 42 to force the pawl from its interlocking relationship with ratchet 38 so as to release chain wheel 16. Simultaneously, the extension part 50 of handle 46 causes the gradual opening of relief valve 56 so as the release handle reaches it full over-center open position, pawl 42 is entirely disengaged from the ratchet wheel and the relief valve has been rotated into its full open position. Upon the opening of relief valve 56, the hydraulic fluid within cylinders 22, 24 at their active sides 23 is dumped through relief valve orifice 63 into a tank 68 and the fluid pressure from the hand brake system is relieved. Chain wheel 16 is associated with a helical spring 70 which is positioned under the wheel and anchored between the wheel and housing 12 of the brake. During winding movement of the chain wheel, that is, during actuation and setting of the brake system, spring 70 is coiled. Upon the opening of relief valve 56 and the venting of cylinders 22 and 24, spring 70 causes the chain wheel to counter-rotate thus creating slack in the actuator chain 14 to release the rail car breaking system. This counter-rotative movement of the chain wheel also causes translating movement of gear racks 28 to return the gear racks into their initial positions as well as repositioning the pistons 26 in cylinders 22 and 24. This causes generally all of the hydraulic fluid within the active sides 23 of the cylinders to be dumped to a tank 68. At the same time, hydraulic fluid is drawn from the tank into the inactive sides 25 of the cylinders through line 27, see FIG. 15. It is to be understood that during activation of the system, that is when pumps P 1–P 4 introduce hydraulic fluid into the active sides 23 of the cylinders, fluid is expelled from the inactive cylinder sides 15 into the tank.

When it is desired to reactivate the hand brake system, the release handle 46 is shifted in its over-center actuation from its open to its closed position allowing pawl 46 to drop by gravity into locking contact with ratchet wheel 38 and causing the simultaneous closing of relief valve 56. Pump handle 30 may now be reciprocated in the manner previously described to actuate the braking system by causing the rotation of chain wheel 16 and the tensioning of actuator chain 14. It is understood that in some applications this invention could be modified to utilize only two pumps, such as pumps P 1 and P 4 which would require the pump handle to be actuated twice as much as when using the four pumps described to obtain the desired maximum brake setting pressure. Also, an electric motor could be incorporated to cause the reciprocating movement of linkages 34 and causing the pumping action of the pumps.

In FIG. 25 an alternative hydraulic system is illustrated. The component parts of this system as shown in FIG. 25 are similarly numbered and lettered as those found in FIG. 15 with such components performing the same functions in the same manner. Check valve C 5 has been eliminated and suction check valves C 6 and C 7 added as shown. The manner of operation of the system illustrated in FIG. 25 is like that of the system of FIG. 15 with relief valves R 1, R 2 and R 3 performing the same functions. With regard to both the hydraulic systems disclosed in FIGS. 15 and 25, the number of strokes required of the pump handle in order to reach the desired set braking force can be decreased if pumps P 1–P 4 incorporate a hydraulic dump release from pumps P 3 and P 4 when these pumps reach their relief pressures. Such a release can be an incorporated spool valve or equivalent.

In FIGS. 20–24 a second embodiment of the pump system of this invention is shown. This embodiment is depicted in FIG. 25. Pump handle 30 which is shown without its extension is connected to pumps P 1–P 4 through linkage 34$^1$. In this embodiment linkage 34$^1$ is a rocker bar which is connected by a slip joint 72 to pumps P 3 and P 4. Instead of being separate units as shown in FIG. 1, pumps P 1 and P 4 and pumps P 2 and P 3 are coaxially connected so that each of the paired pumps (P 1 and P 4, P 2 and P 3) work as a unit.

The operation of the pump mechanism illustrated in FIGS. 20–25 operates in similar fashion as that described with the pumping system shown in FIG. 1. The design of pumps P 1–P 4 is such so that it provides a more compact and economical mechanism. Upon reciprocating motion of pump handle 30, which causes rocking movement of the rocker bar, pumps P 1 and P 4 and pumps P 2 and P 3 are reciprocated within their respective bores 74 in housing 76 of the pump system causing the alternating pumping action of one set of the pumps and a filling of the other set of the pumps as previously described in the embodiment shown in FIG. 1. In the figures, the various relief valves, check valves, and inlets and outlets are appropriately labeled. Upon reaching a first selected pressure in cylinders 22 and 24, relief valve R 2 is opened allowing pump P 4 to drain to tank 68. Upon reaching the next selected cylinder pressure, relief valve R 1 is opened to allow pump P 3 to drain to the tank. Prior to the opening of relief valves R 1 and R 2, the hydraulic fluid from all of the pumps passes onto cylinders 22 and 24. Thus, pump P 4 pumps hydraulic fluid through check valves C 4, C 1 and into the cylinders 22 and 24. Pump P 1 pumps fluid through check valve C 1 into the cylinders; pump P 3 pumps hydraulic fluid through check valves C 3 and C 2 to the cylinders, and pump P 2 pumps hydraulic fluid through check valve C 2 to the cylinders. Check valves C 6 and C 7 allow fluid to be drawn from tank 68 into the pumps while preventing fluid flow to the tank by bypassing relief valves R 1 and R 2. When the desired actuating pressure has been reached in cylinders 22 and 24, relief valve R 3 is opened causing pumps P 1 and P 2, to dump their hydraulic fluid through the relief valves into tank 68. Relief valves R 1 and R 2 were already opened as selected cylinder pressures were reached. Valve 56 which is the main relief valve when once opened by actuation of the connected release handle 46, previously described, allows hydraulic fluid which is pressurized in cylinders 22, 24 at their active sides 23 to be dumped into tank 68 thus relieving the hydraulic pressure in the cylinders to permit chain wheel 16 under the bias of spring 70 to be counter-rotated to cause the connected chain 14 to become slack and racks 28 reset for the next pumping operation. At the same time, fluid is drawn from the tank through line 27 into the inactive sides 25 of the cylinders.

Figure 20:
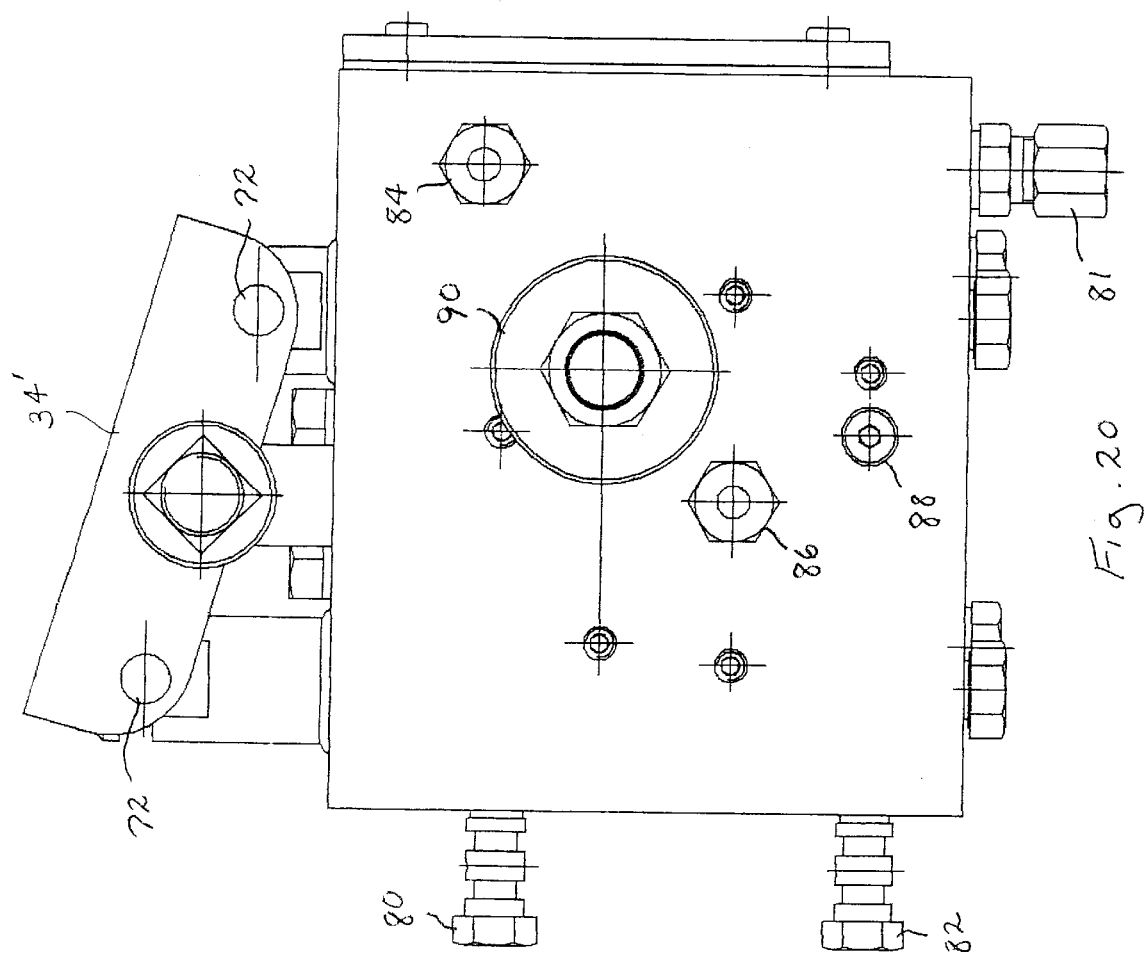
FIG. 20 is a face view of an alternative and preferred embodiment of the pump components for the braking system of this invention.
Figure 21:
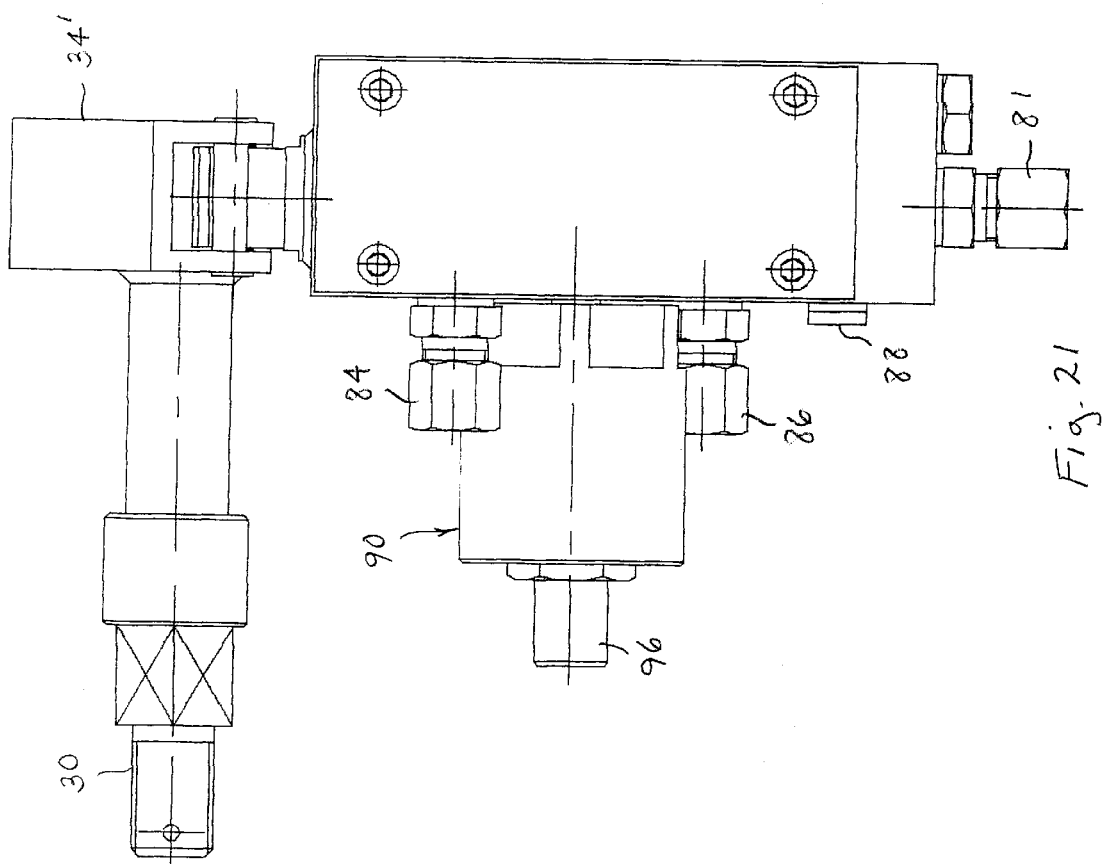
FIG. 21 is an end view of the pump components of FIG. 20.
Figure 22:
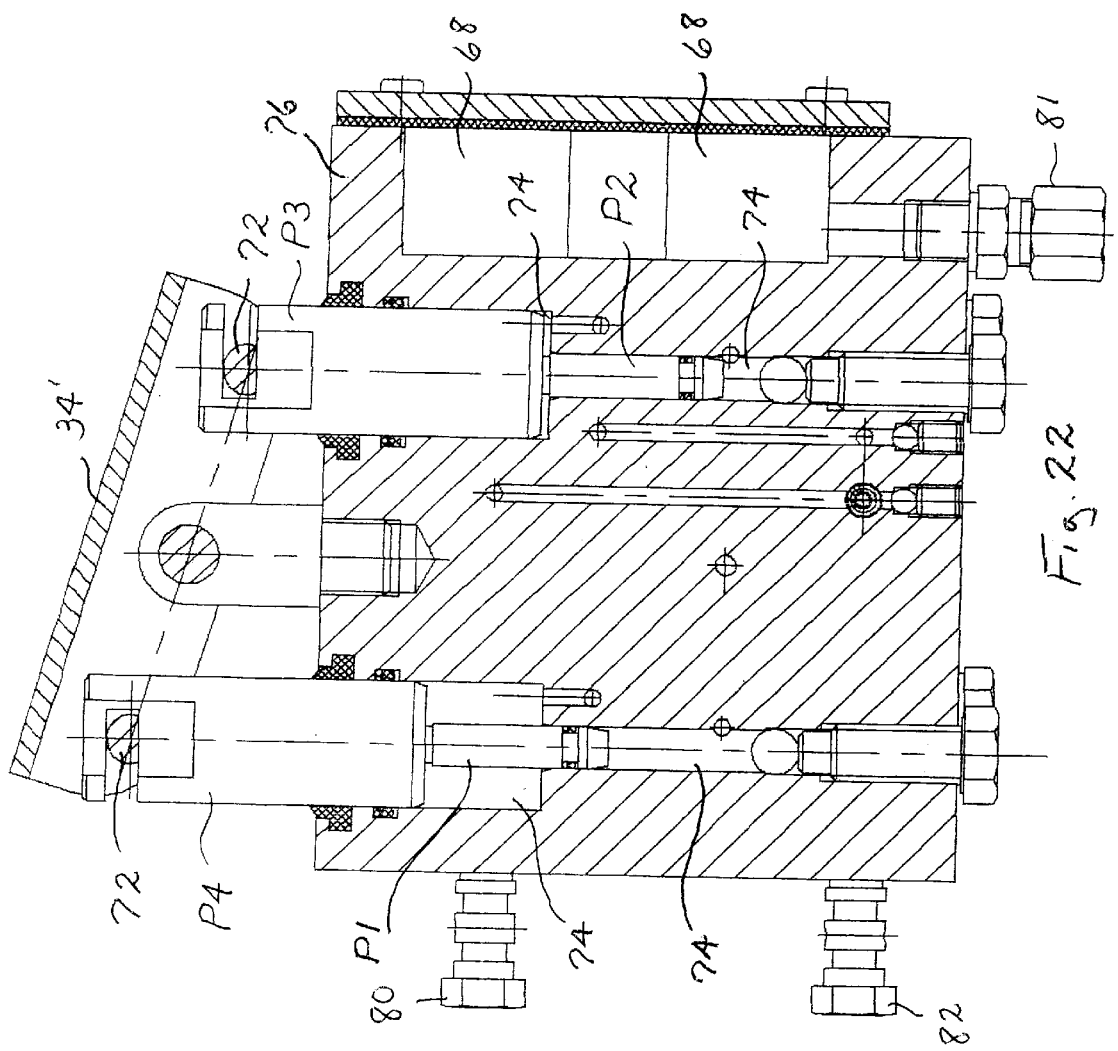
FIG. 22 is a sectional view of the pump components of FIG. 20.
Figure 23:
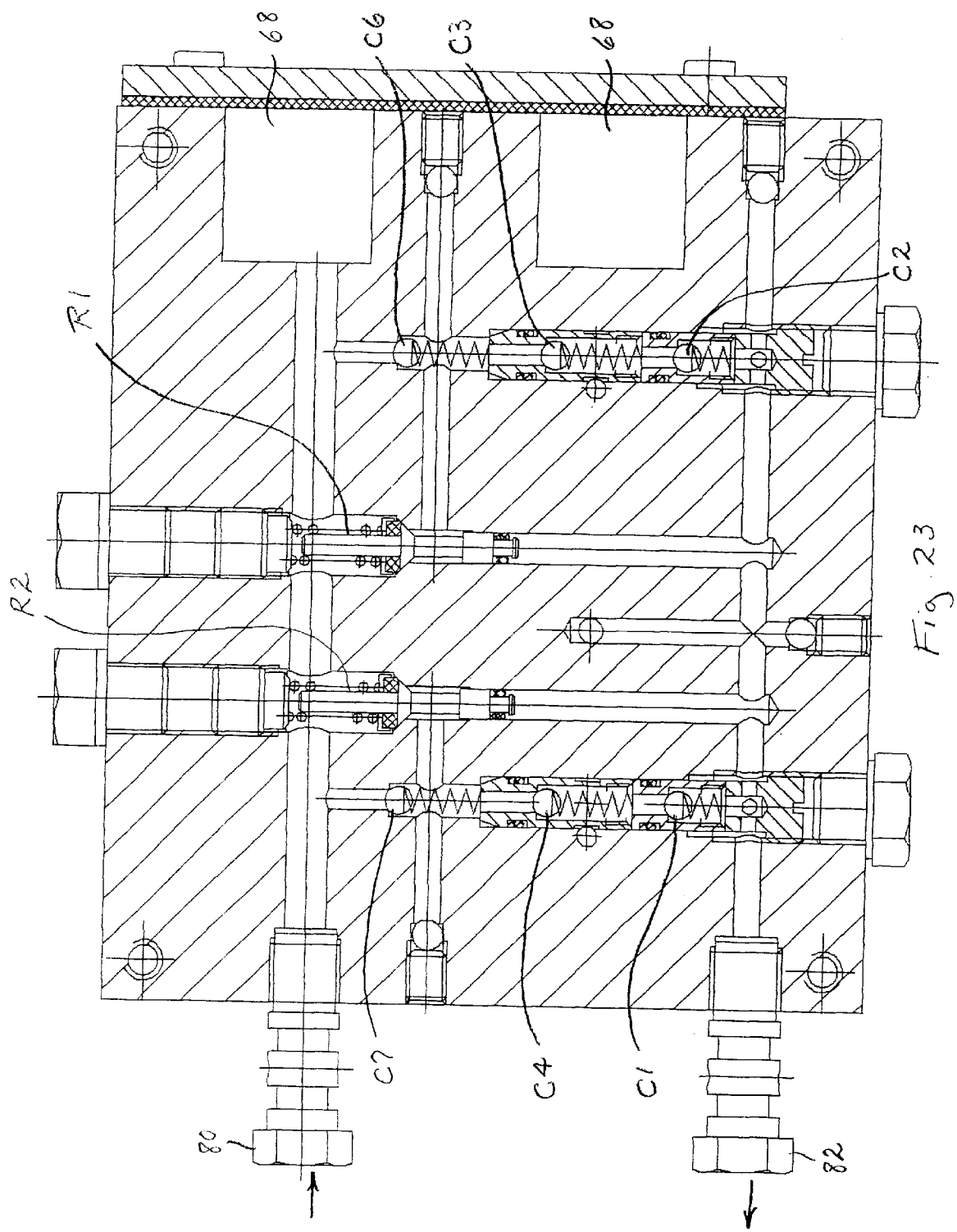
FIG. 23 is another sectional view of the pump components of FIG. 20.
Figure 24:
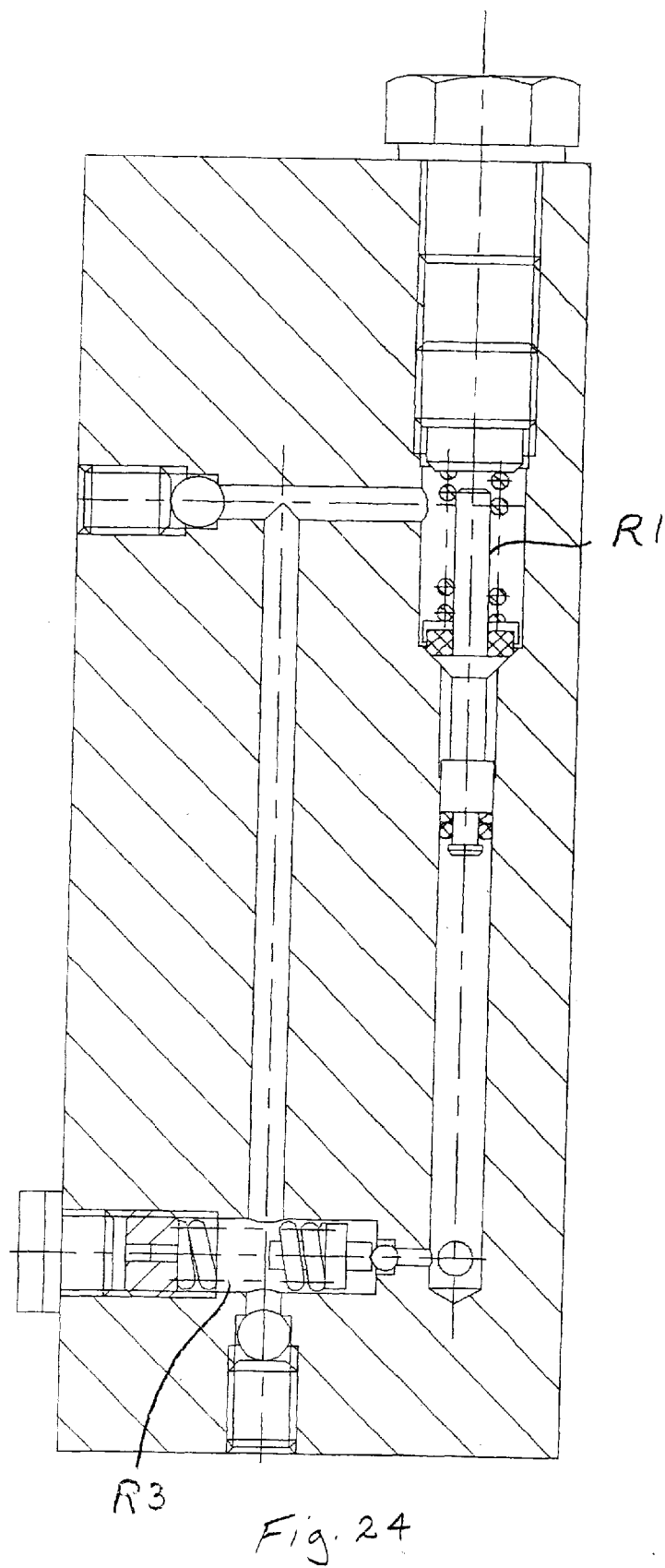
FIG. 24 is another sectional view of the pump components of FIG. 20.

Referring to FIG. 20, connector 80 receives the return oil from cylinders 22, 24. Connector 82 is connected to the relief valve 56. Connector 84 is a hydraulic fluid return from cylinders 22, 24 and connector 86 is a hydraulic fluid outlet to the cylinders. Connector 88 is connected for hydraulic fluid flow to relief valve R 3.

Figure 16:
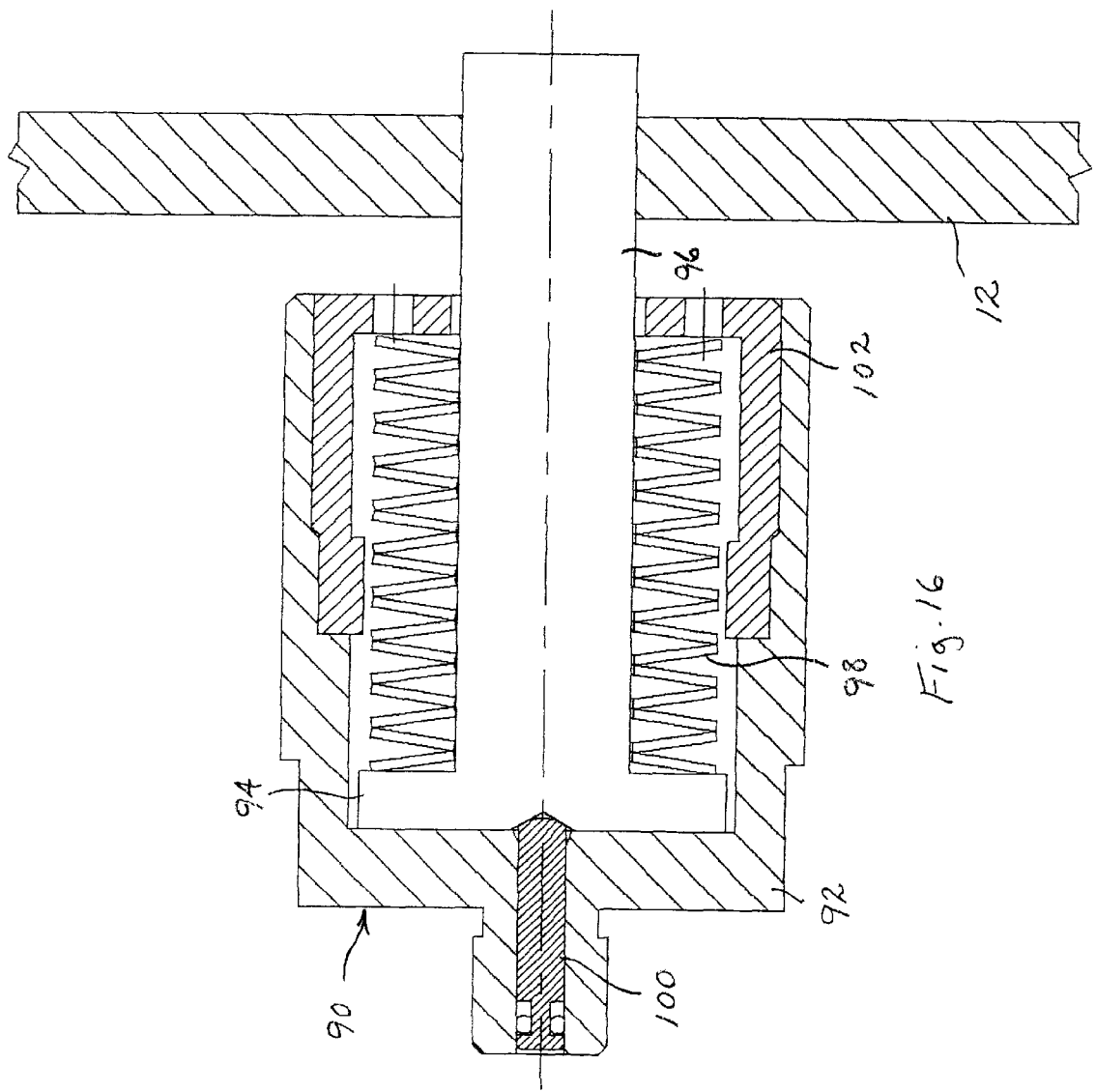
FIG. 16 is a sectional view of the brake indicator.
Figure 17:
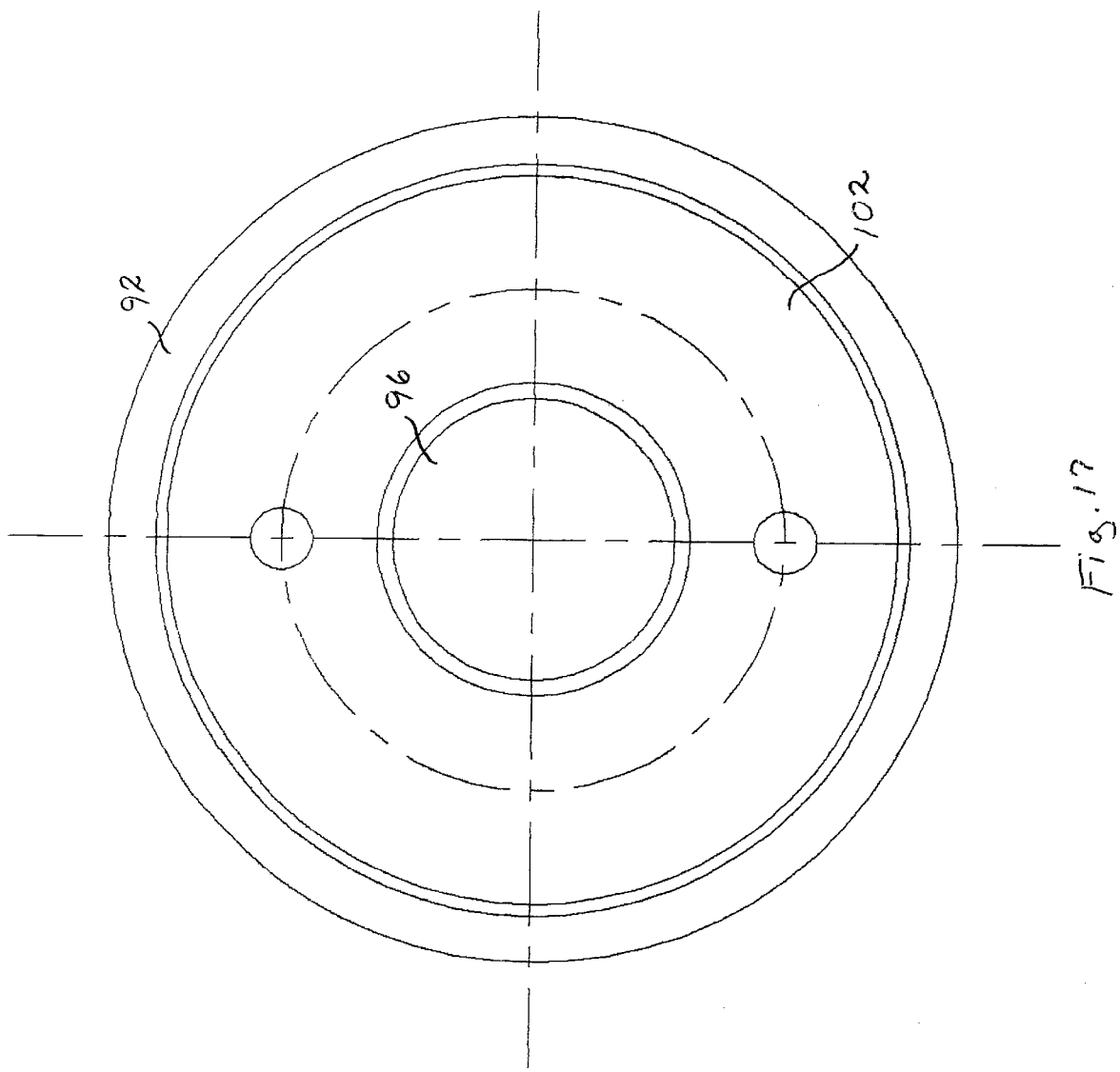
FIG. 17 is an end view of the brake indicator.

In order to provide a visual indication to the brakeman or user of the brake system of this invention, an indicator 90 is supported by housing 12 in the embodiment of FIG. 1 or housing 76 of the embodiment of FIG. 20. Indicator 90 includes, as best illustrated in FIGS. 16 and 17, a cylindrical housing 92 into which a reciprocal piston 94 is located. Piston 94 includes a pin extension 96 which is retained into a retracted position by a spring 98. The tip of pin extension 96 protrudes through the outer housing for the brake system such as housing 12. A sealed plunger 100 extends through the base of housing 92 into contact with cylinder 94. Plunger 100 is connected by a suitable conduct to the fluid line pressure of cylinders 22, 24. As such, as the pressure in cylinders 22,24 increases due to the actuation of pumps P 1–P 4, shaft 100 is pushed inwardly relative to housing 92 causing piston 94 to move outwardly with its pin extension being more visible to the brake user, compressing spring 98. The resistance of spring 98 and thus the operable pressure of the indicator is set by a rotatable threaded housing cap 102 such that when the desired maximum brake pressure within cylinders 22, 24 and the brake system is reached, pin extension is at a certain measured distance (dimension "X" in FIG. 15) in its protrusion from housing 92, thus providing a visual indicator to the brake user that the brake system has reached its braking pressure. Once pressure valve 56 is actuated to drain cylinders 22, 24, spring 98 will return piston 94 to its retracted position, causing shaft 100 to be pushed outwardly relative to the housing. Indicator 90 also serves as a visual indicator to inspectors indicating that the brake system upon the rail car is applied and that no hydraulic leakages have occurred which would release the system.

Figure 14:
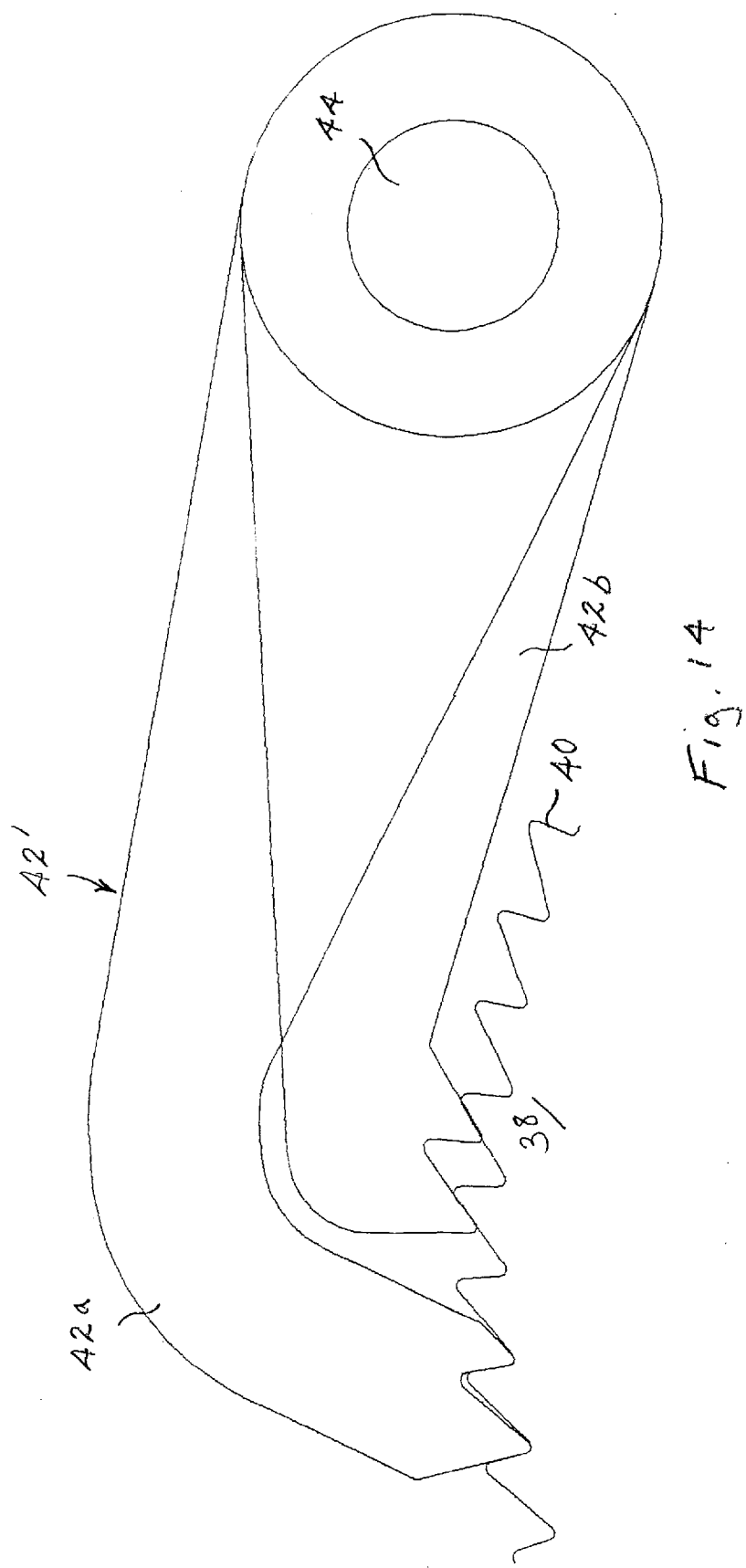
FIG. 14 is a view of the pawl shown in an alternative form.

Lastly, referring to FIG. 14, a modified embodiment of pawl 42 is shown. Pawl $42^1$ is of a two-part form consisting of part 42a and 42b. Each of the parts 42a and 42b are journaled about pin 44. Pawl part 42a is longer than pawl part 42b so as that as the pawl parts each pass over the teeth 40 of ratchet wheel 38 only the teeth of one pawl part interlocks with the teeth of the ratchet wheel while the teeth of the other pawl part is aligned but not interlocking with another set of teeth of the ratchet wheel. In this manner the two pawl parts provide alternating lock points to allow for closer control of the engagement or lock force between the pawl and the ratchet wheel.

The invention is not to be limited to the details above given but may be modified within the scope of the following claims:

1. A hand brake for a rail car having a brake system which includes an actuator chain, said brake adapted for connection to said chain and comprising a chain wheel for connection to said chain, a hydraulic cylinder including a drive piston, said drive piston including gear means engaging said chain wheel for imparting rotative movement to the wheel upon extension of the piston to cause said chain to be wound about the wheel to actuate said brake system.

2. The brake of claim 1 and releasable securement means for securing said chain wheel against said rotative movement after actuation of said brake system.

3. The brake of claim 2 wherein said securement means provides for said rotative movement only in one direction during extension of said drive piston.

4. The brake of claim 3 and a housing mounting said chain wheel and hydraulic cylinder, wherein said securement means includes a toothed ratchet wheel connected coaxially to said chain wheel and a pawl pivotally carried by said housing.

5. The brake of claim 2 and means for venting said hydraulic cylinder to reduce the hydraulic pressure therein in conjunction with the release of said securement means to free said chain wheel for reverse rotative movement.

6. The brake of claim 5 and spring means associated with said chain wheel for imparting said reverse rotative movement to the chain wheel.

7. The brake of claim 5 wherein said venting means is a valve connected to said hydraulic cylinder and adapted for connection to a hydraulic fluid reservoir, said valve means including a selected sized outlet orifice to said reservoir for regulating the rate of hydraulic fluid flow from said hydraulic cylinder to the reservoir through the valve means.

8. The brake of claim 1 and pump means connected to said hydraulic cylinder for introducing hydraulic fluid into said hydraulic cylinder, means for disabling said pump means when a selected hydraulic pressure in said hydraulic cylinder is reached.

9. The brake of claim 8 wherein said pump means includes connected first and second pump components, means for disabling one of said first and second pump components when a second selected pressure less than said first mentioned selected pressure in said hydraulic cylinder is reached.

10. The brake of claim 9 and means for disabling said other of said first and second pump components when said first mentioned selected pressure in said hydraulic cylinder is reached.

11. The brake of claim 1 wherein said hydraulic cylinder has an active side and an inactive side, pump means connected to said hydraulic cylinder for introducing hydraulic fluid into said hydraulic cylinder at its said active side, said inactive side of said hydraulic cylinder adapted for connection to a hydraulic fluid reservoir to permit said hydraulic fluid to be discharged from and drawn into said inactive side upon said introduction of hydraulic fluid into and discharge of hydraulic fluid respectively from said active side of the hydraulic cylinder.

12. The brake of claim 1 and pump means connected to said hydraulic cylinder for introducing hydraulic fluid into the hydraulic cylinder under pressure, and an indicator means responsive to said pressure for indicating the state of actuation of said brake system.

13. The brake of claim 12 wherein said indicator means includes a housing and a piston reciprocally housed in said housing, said indicator means piston includes an extension exteriorly visible from said housing, movement of said indicator means piston in said housing being responsive to said pressure.

14. The brake of claim 13 wherein said housing includes a threaded cap part overlying said indicator means piston at one side of such piston, a spring seated in compression in said housing between said indicator means piston and said cap part, said cap part being shiftable toward and away from said indicator means piston to set the operable pressure of the indicator means.

15. The brake of claim 1 and a second hydraulic cylinder including a drive piston having gear means engaging said chain wheel for imparting rotative movement to the wheel upon retraction of said second hydraulic cylinder drive piston, pump means connected to said first mentioned hydraulic cylinder and said second hydraulic cylinder for introducing hydraulic fluid into said first mentioned and second hydraulic cylinders, means for disabling said pump means when a selected hydraulic pressure in at least one of said first mentioned and second hydraulic cylinders is reached.

16. The brake of claim 15 wherein said pump means includes first, second, third and fourth pump components, said pump components each connected to said first mentioned and second hydraulic cylinders for introducing hydraulic fluid into the hydraulic cylinders, means for disabling at least one of said pump components when said selected pressure in said one first mentioned and second hydraulic cylinder is reached.

17. The brake of claim 16 and means for disabling the remainder of said pump components when a second selected pressure more than said first mentioned selected pressure in said one of said first mentioned and second hydraulic cylinders is reached.

18. The brake of claim 15 and releasable securement means for securing said chain wheel against rotative movement after actuation of said brake system.

19. The brake of claim 18 and means for venting said hydraulic cylinders to reduce the hydraulic pressure in the cylinders in conjunction with the release of said securement means to free said chain wheel for reverse rotative movement.

20. The brake of claim 19 and spring means associated with said chain wheel for assisting said reverse rotative movement to the chain wheel.

\* \* \* \* \*